(12) United States Patent
Nishiyashiki

(10) Patent No.: US 8,819,323 B2
(45) Date of Patent: Aug. 26, 2014

(54) DATA TRANSFER CIRCUIT AND DATA TRANSFER METHOD

(75) Inventor: Masaru Nishiyashiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 13/137,983

(22) Filed: Sep. 22, 2011

(65) Prior Publication Data

US 2012/0017017 A1 Jan. 19, 2012

Related U.S. Application Data

(63) Continuation of application No. PCT/JP2009/056742, filed on Mar. 31, 2009.

(51) Int. Cl.
G06F 13/14 (2006.01)

(52) U.S. Cl.
USPC .......................... 710/242; 710/244; 710/316

(58) Field of Classification Search
USPC .............. 710/29, 52, 56, 110, 113, 119, 309, 710/310, 240–244, 316, 317
See application file for complete search history.

(56) References Cited

U.S. PATENT DOCUMENTS

| 5,418,967 | A | * | 5/1995 | Simcoe et al. ................ 710/241 |
| 5,689,713 | A | | 11/1997 | Normoyle et al. |
| 5,892,957 | A | | 4/1999 | Normoyle et al. |
| 5,907,485 | A | | 5/1999 | Van Loo et al. |
| 6,009,275 | A | * | 12/1999 | DeKoning et al. ............ 710/220 |
| 6,141,715 | A | * | 10/2000 | Porterfield .................... 710/113 |
| 6,230,229 | B1 | * | 5/2001 | Van Krevelen et al. ....... 710/317 |
| 6,260,174 | B1 | * | 7/2001 | Van Loo ........................ 714/811 |
| 6,295,598 | B1 | | 9/2001 | Bertoni et al. |
| 6,973,521 | B1 | * | 12/2005 | Indiresan et al. ............. 710/200 |
| 7,080,174 | B1 | * | 7/2006 | Thorsbakken et al. ....... 710/112 |
| 7,246,188 | B2 | * | 7/2007 | Ganasan et al. .............. 710/241 |
| 7,748,001 | B2 | * | 6/2010 | Burns et al. .................. 718/100 |
| 7,986,625 | B2 | * | 7/2011 | Chase et al. .................. 370/231 |
| 2002/0046323 | A1 | | 4/2002 | Kawano |
| 2003/0065847 | A1 | * | 4/2003 | Goodrum et al. ............. 710/113 |
| 2004/0225755 | A1 | * | 11/2004 | Quach ............................. 710/1 |

FOREIGN PATENT DOCUMENTS

| JP | 9-16542 | 1/1997 |
| JP | 9-293050 | 11/1997 |
| JP | 11-143824 | 5/1999 |
| JP | 11-167546 | 6/1999 |

(Continued)

OTHER PUBLICATIONS

International Search Report for PCT/JP2009/056742, mailed Jun. 16, 2009.

(Continued)

*Primary Examiner* — Khanh Dang
(74) *Attorney, Agent, or Firm* — Staas & Halsey LLP

(57) ABSTRACT

A port A request queue is configured with a port AQ0 to a port AQn for each of request types Q0 to Qn connected with a requester resource busy flag controller Q0 to a requester resource busy flag controller Qn, respectively. A port A resource checking unit of a port X arbiter unit gives instructions to the requester resource busy flag controller of the port AQ0 to turn a busy flag on when it is determined that a data request from the port AQ0 has difficulty in being output to a port X inter-port arbiter unit due to resources being busy as a result of referring to a resource information unit of a port X resource managing unit. The port AQ0 inhibits output of a data request as long as the busy flag is on.

6 Claims, 16 Drawing Sheets

(56) References Cited

FOREIGN PATENT DOCUMENTS

| | | |
|---|---|---|
| JP | 11-191076 | 7/1999 |
| JP | 2002-123371 | 4/2002 |
| JP | 2002-519785 | 7/2002 |
| WO | WO 99/32981 | 7/1999 |

OTHER PUBLICATIONS

European Search Report for PCT/JP2009/056742 mailed Oct. 18, 2012.

\* cited by examiner

DATA TRANSFER CIRCUIT AND DATA TRANSFER METHOD

CROSS-REFERENCE TO RELATED APPLICATION

This application is a continuation of International Application No. PCT/JP2009/056742, filed on Mar. 31, 2009, the entire contents of which are incorporated herein by reference.

FIELD

The embodiments discussed herein are directed to a data transfer circuit and a data transfer method.

BACKGROUND

Conventionally, a computer device is known that is configured with a cross-bar board to connect a control device such as a central processing unit (CPU) as an arithmetic processing unit, a system board including an I/O port, a memory and a system controller, and an I/O board including an external storage device and an I/O port.

The system board and the I/O boards send data to other system boards or I/O boards via the cross-bar board. When the cross-bar board is configured to connect a plurality of system boards and I/O boards, arbitration of requests for data transfer is carried out by priority control in the cross-bar board through which the data sent by the respective system boards and the I/O boards are transferred.

To efficiently carry out arbitration of data transfer in the cross-bar board and to improve efficiency in data transfer, various conventional technologies have been provided. For example, as a conventional technology, concerning memory access in a computer device, proposed is an arbitration method in which arbitration is carried out by excluding a memory bus acquisition request for a memory bank in a memory bank busy state from a subject of arbitration.

Furthermore, as a conventional technology, concerning memory access in a computer device, proposed is an arbitration method in which a communication interface device with higher memory bus use priority inhibits sending a bus use request from the own device while a memory bus use request sent from a communication interface device of lower priority is waiting, and cancels the inhibition when the number of inhibitions becomes a given value or more.

As a conventional technology, concerning memory access in a computer device, proposed is an arbitration method in which, when a bus agent executes a transaction for the first time, and thereafter the transaction is interrupted, and another bus agent then completes another transaction, a bus access right is given exclusively to the bus agent that is held in a state of not being able to complete the transaction until the transaction is completed.

As a conventional technology, arbitration of data transfer in a cross-bar board to be carried out, not in one stage, but in two stages is proposed. More specifically, arbitration is carried out in each I/O port of data request sources as the first stage arbitration. The data requests that acquired send rights are then sent to respective I/O ports of request destinations and arbitration of the data requests from a plurality of I/O ports is carried out in the respective I/O ports of request destinations as the second stage arbitration. Accordingly, proposed is an arbitration method that improves efficiency of data transfer by simultaneously carrying out arbitration of data requests from a plurality of request sources to a plurality of request destinations.

Patent Document 1: Japanese Laid-open Patent Publication No. 11-167546
Patent Document 2: Japanese Laid-open Patent Publication No. 09-293050
Patent Document 3: Japanese Laid-open Patent Publication No. 11-143824

In recent years, the number of kinds of request type for each I/O port has been increasing. Therefore, in the above-described conventional technologies, even when a data request the I/O port of the request destination of which is in a resource busy state is controlled so as not to participate in the first stage arbitration, many data requests the I/O ports of the request destinations of which are not in a resource busy state become participants in the first stage arbitration and thus a bus is occupied. Consequently, there is a likelihood of a live lock state occurring where a data request, which has difficulty in participating in the second arbitration at the timing of resource busy state of the I/O port of the request destination being resolved, continues to reside and thus has difficulty in acquiring a right of the data request.

Furthermore, a situation is considered in which, even though there are interdependent relationships among request types of the same data request source or I/O ports of a data request destination, a request that has difficulty in being output due to resources being busy remains in a second stage arbiter. In this case, there is a likelihood of a deadlock state occurring in which, while overtaking the order of data request needs to be performed between specific data requests, the data request that needs to be overtaken remains in a state where the data request is unable to acquire a data request right in arbitration because the data request has difficulty in participating in the first stage arbitration.

Regardless of interdependent relationships, a situation is considered in which a request that has difficulty in being output due to resources being busy remains in the second stage arbiter. In this case, an I/O port of a data request source does not output other types of data request until the output data request acquires resources of an I/O port of a data request destination. Consequently, even when an I/O port of a data request destination of other types of data request is not in a resource busy state, a situation remains where it is not possible to acquire a data request right, thereby deteriorating throughput of data transfer.

SUMMARY

According to an aspect of an embodiment of the invention, a data transfer circuit being connected to control circuits and data input/output circuits and carrying out data transfer between the control circuits and/or the data input/output circuits, the data transfer circuit includes a receive resource usage monitoring unit that monitors usage of receive resources of the control circuits and/or the data input/output circuits on receiving side receiving data corresponding to a data request requesting the data transfer; a data request storage unit that stores therein the data request received from the control circuits and/or the data input/output circuits on sending side of the data request and corresponding data; an output controller that controls whether to output the data request stored in the data request storage unit; an arbitration unit that receives a plurality of data requests output from the data request storage unit provided in plurality and selects a single data request by arbitration from the plurality of data requests; and a data transfer unit that carries out data transfer for the data request selected by the arbitration unit, wherein the output controller inhibits output of the data request when usage of the receive resources monitored by the receive resource usage monitoring unit is in a busy state.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The explanation will be made in the order of a schematic configuration of a computer device as an information processing apparatus according to a conventional technology and the disclosed technology, an arbitration process and problems in a conventional technology, and one example of a first embodiment, one example of a second embodiment, and one example of a third embodiment to solve the problems in the conventional technology. A term "data" used in the followings is a packet and a term "data request" is a request packet. In the followings, a situation of sending a data request of a later described request type Q0 from a later described port A 103 to a later described port X 113 will be exemplified.

Schematic Configuration of Computer Device

Figure 1:
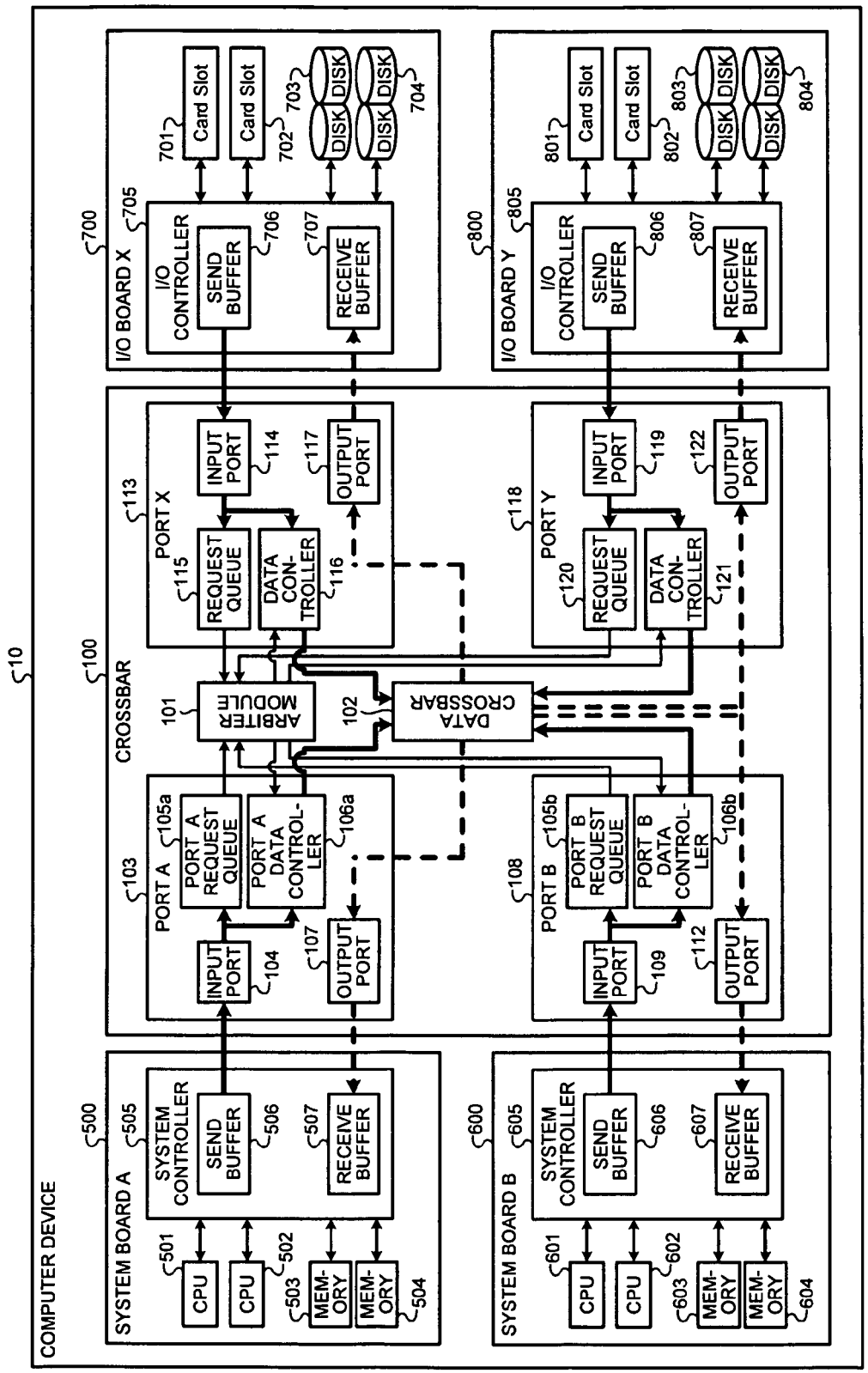
FIG. 1 is a block diagram schematically illustrating an example of a configuration of a computer device.

FIG. 1 is a block diagram schematically illustrating a configuration of a computer device according to a conventional technology and the disclosed technology. In a computer device 10, a cross-bar board (corresponds to a data transfer circuit, and hereinafter, abbreviated as a crossbar) 100 is connected with a system board A 500, a system board B 600, an I/O board X 700, and an I/O board Y 800.

In regard to the conventional technology and the disclosed technology, positioning of the system boards and the I/O boards with respect to the crossbar is the same. Concerning the conventional technology and the disclosed technology, a term "resource" means a storage area for each request type in receive buffers of the system boards and the I/O boards described later. The receive buffer and the request type will be described later.

In the system board A 500 as a processing unit, a CPU 501 and a CPU 502 as an arithmetic processing unit, and a memory 503 and a memory 504 are connected to a system controller 505. The CPU 501 and the CPU 502 are arithmetic devices that carry out various arithmetic processes in the computer device 10. The memory 503 and the memory 504 are storage units that temporarily store therein results of arithmetic operations carried out by the CPU 501 and the CPU 502, and store therein data transferred from the I/O board X 700 and/or the I/O board Y 800.

The system controller 505 is a control circuit that controls the whole system board A 500. In particular, the system controller 505 includes send/receive buffers for various data requests, various types of data, and the like sent and received between the CPU 501 and the CPU 502 and the crossbar 100, or between the memory 503 and the memory 504 and the crossbar 100. The system controller 505 includes a send buffer 506 for various data requests, various types of data, and such sent from the CPU 501 and the CPU 502 or the memory 503 and the memory 504 to the crossbar 100, and a receive buffer 507 for various data requests, various types of data, and such received from the crossbar 100.

The send buffer 506 is a buffer that temporarily stores therein various data requests output from the CPU 501 or the CPU 502 to the other system board or the I/O boards. The data request temporarily stored in the send buffer 506 is sent to an input port 104 of a port A 103 in the later described crossbar 100. The data request here is a request concerning sending/receiving of data. There is actual data that is sent or received corresponding to the data request.

The receive buffer 507 temporarily stores therein various requests or data received from the later described crossbar 100. Each of the various requests and the data temporarily stored in the receive buffer 507 is output to the CPU 501 and/or the CPU 502, and the memory 503 and/or the memory 504.

The system board B 600 has the same configuration as that of the system board A 500. The system board B 600 has a system controller 605 that includes a CPU 601 and a CPU 602, a memory 603 and a memory 604, a send buffer 606, and a receive buffer 607. The function and process of each of the constituents of the system board B 600 are the same as those of each constituent of the system board A 500. The functional units of the same names except for reference numerals have the same functions and carry out the same processes.

The number of system boards connected to the crossbar 100 is not limited to two of the system board A 500 and the system board B 600 described above. While each of the system boards include the two CPUs and the two memories, they are not limited to two each, and the system boards may include functional units other than CPUs and memories.

The crossbar 100 includes an arbiter module 101, a data crossbar 102, the port A 103, a port B 108, the port X 113, and a port Y 118. The arbiter module 101 carries out arbitration of various types of requests output from the port A 103, the port B 108, the port X 113, and the port Y 118 according to a priority control such as a round robin and a least recently used (LRU) algorithm.

The data crossbar 102 outputs data corresponding to a data request that won arbitration in the arbiter module 101 out of data requests output from the respective ports in the crossbar 100 to a destination port. The term "win arbitration" here means that a data request acquires a right to carry out an actual data request in arbitration in the arbiter module 101. The data request that won the arbitration is output from the data crossbar to a destination port. On the other hand, the term "lose arbitration" means that a data request has failed to acquire the right to carry out an actual data request in the arbitration. In other words, the data request that lost arbitration is not output from the data crossbar to a destination port.

The port A 103 includes the input port 104, a port A request queue 105a, a port A data controller 106a, and an output port 107. The input port 104 sorts and outputs a data request received from the send buffer 506 of the system controller 505 in the system board A 500 to the port A request queue 105a and data to the port A data controller 106a.

The port A request queue 105a outputs the data request received from the input port 104 to the arbiter module 101. The port A data controller 106a temporarily stores therein data corresponding to the data request that the port A request queue 105a receives from the input port 104. The port A data controller 106a then outputs, when notified of the corresponding data request having won arbitration from the arbiter module 101, the data corresponding to the data request that won the arbitration to the data crossbar 102. The output port 107 receives data output from the data crossbar as a destination port.

The port B 108 is a port that corresponds to the system board B 600. The port B 108 has the same configuration as that of the port A. The port B 108 includes an input port 109, a port B request queue 105b, a port B data controller 106b, and an output port 112. The functional units of the same names except for reference numerals have the same functions and carry out the same processes as those functional units in the port A 103.

The port X 113 includes an input port 114, a request queue 115, a data controller 116, and an output port 117, while the port Y 118 includes an input port 119, a request queue 120, a data controller 121, and an output port 122. Each of the functional units is different in terms of being connected to the I/O board X 700 or the I/O board Y 800 in place of the system board A 500 or the system board B 600, respectively, and has the same function and carries out the same process as the corresponding functional units of the port A 103 and the port B 108.

The I/O board X 700 is configured with a card slot 701 and a card slot 702, and a disk storage device 703 and a disk storage device 704 being connected to an I/O controller 705. The card slot 701 and the card slot 702 are interfaces as function expansion devices that connect the computer device 10 with external storage devices. The disk storage device 703 and the disk storage device 704 are storage devices that store therein data used by the computer device 10.

The I/O controller 705 controls data input/output of the whole I/O board X 700. In particular, the I/O controller 705 includes send/receive buffers for various data requests, various types of data, and the like sent and received between the crossbar 100 and an external storage device connected to the card slot 701 or the card slot 702, or the disk storage device 703 or the disk storage device 704.

The I/O controller 705 includes a send buffer 706 for various data requests, various types of data, and such sent and received between the crossbar 100 and external storage devices connected to the card slot 701 and the card slot 702, or the disk storage device 703 and the disk storage device 704, and a receive buffer 707 for various data requests, various types of data, and such received from the crossbar 100.

The send buffer 706 is a buffer that temporarily stores therein data sent corresponding to a data request from the system board A 500 or the system board B 600. The data temporarily stored in the send buffer 706 is sent to the input port 114 of the port X 113 in the later described crossbar 100.

The receive buffer 707 temporarily stores therein data corresponding to various data requests received from the later described crossbar 100. The various types of respective data stored in the receive buffer 707 are output to external storage devices connected to the card slot 701 and the card slot 702, or the disk storage device 703 and the disk storage device 704.

The I/O board Y 800 is configured the same as that of the I/O board X 700. The I/O board Y 800 includes a card slot 801 and a card slot 802, a disk storage device 803 and a disk storage device 804, and an I/O controller 805 that includes a send buffer 806 and a receive buffer 807. The function and process of each of the constituents are the same as those of each constituent of the I/O board X 700. The functional units of the same names except for reference numerals have the same functions and carry out the same processes.

The number of I/O boards connected to the crossbar 100 is not limited to two of the I/O board X 700 and the I/O board Y 800 described above. While each of the I/O boards includes the two card slots and the two disk storage devices, they are not limited to two each, and the I/O boards may include functional units other than card slots and disk storage devices.

Detailed Configuration of Crossbar in Conventional Technology

Figure 2:
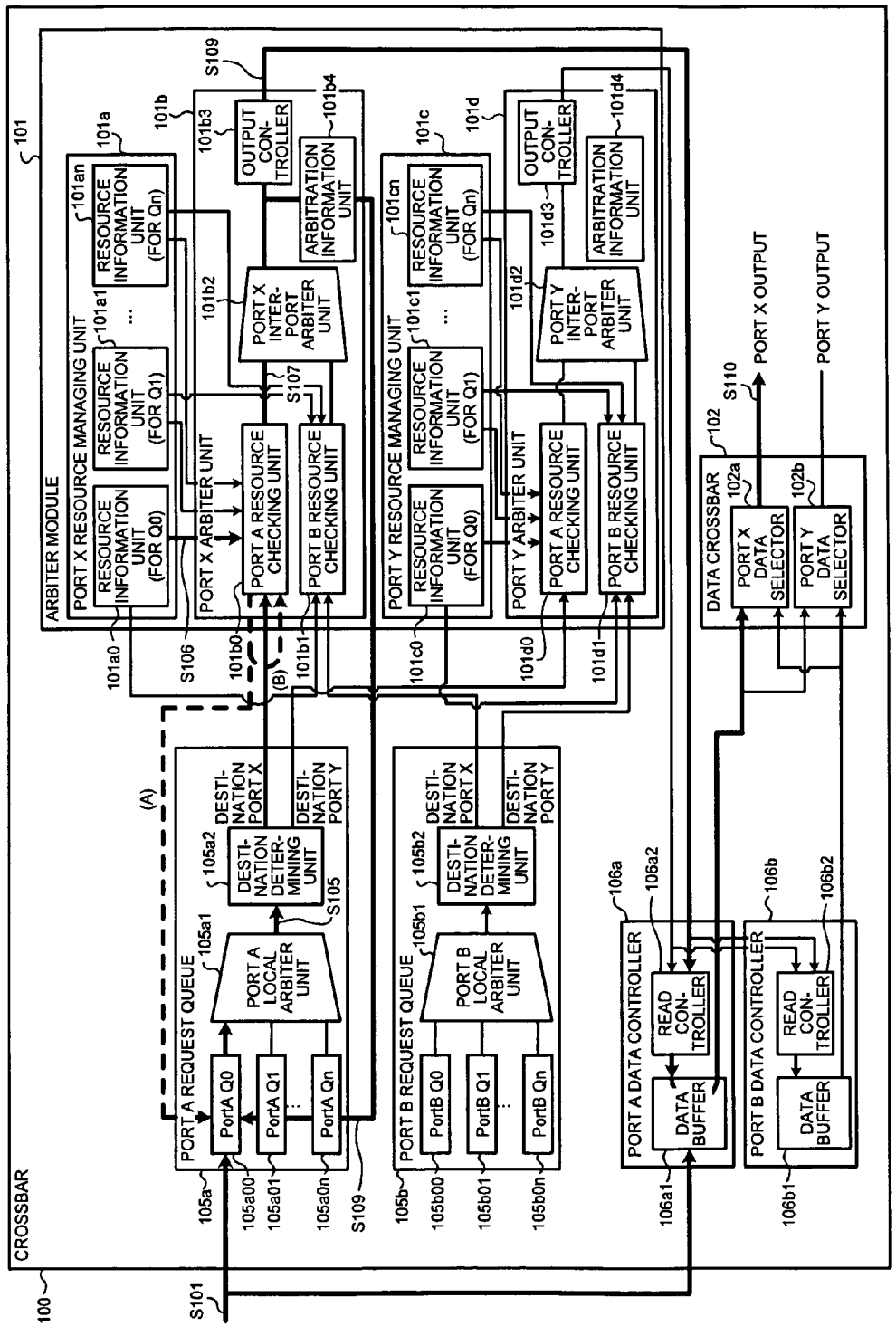
FIG. 2 is a block diagram illustrating a configuration of a crossbar 100.

FIG. 2 is a block diagram illustrating a configuration of the crossbar 100 in a conventional technology. In FIG. 2, the arbiter module 101, the data crossbar 102, the port A request queue 105a and the port B request queue 105b, and the port A data controller 106a and the port B data controller 106b are indicated and descriptions of other configurations are omitted.

The arbiter module 101 includes a port X resource managing unit 101a, a port X arbiter unit 101b, a port Y resource managing unit 101c, and a port Y arbiter unit 101d. While the arbiter module 101 includes the port A resource managing unit, the port A arbiter unit, the port B resource managing unit, and the port B arbiter unit, their explanations are omitted. This is to explain an example situation of sending a data request from the port A request queue 105a of the port A 103 to the port X 113 of destination.

The port A request queue 105a and the port B request queue 105b are queues that manage data received from the input port 104 and the input port 109, respectively, and hold information used for arbitration, for example, a destination of data and a size of data.

The port A request queue 105a includes a port AQ0 105a00, a port AQ1 105a01, . . . , and a port AQn 105a0n that receive data requests of respective types, a port A local arbiter unit 105a1, and a destination determining unit 105a2. The references Q0, Q1, . . . , and Qn represent types of data requests (hereinafter, referred to as request types).

The port A local arbiter unit 105a1 carries out arbitration of data requests received from the port AQ0 105a00, the port AQ1 105a01, . . . , and the port AQn 105a0n. The destination determining unit 105a2 outputs a data request that won arbitration to the port X arbiter unit 101b or the port Y arbiter unit 101d according to a destination. In other words, the arbitration is carried out in two stages in the port A local arbiter unit 105a1 and in the port X arbiter unit 101b or the port Y arbiter unit 101d.

The port B request queue 105b includes a port BQ0 105b00, a port BQ1 105b01, . . . , and a port BQn 105b0n, a port B local arbiter unit 105b1, and a destination determining unit 105b2. The function and process of each of the constituents of the port B request queue 105b are the same as those of each constituent of the port A request queue 105a. The functional units of the same names except for reference numerals have the same functions and carry out the same processes.

The port X resource managing unit 101a of the arbiter module 101 includes a resource information unit (for Q0) 101a0, a resource information unit (for Q1) 101a1, . . . , and a resource information unit (for Qn) 101an. The resource information unit (for Q0) 101a0, the resource information unit (for Q1) 101a1, . . . , and the resource information unit (for Qn) 101an acquire and manage respective usage of a queue Q0, a queue Q1, . . . , and a queue Qn for each type of request data in the receive buffer 707 of the I/O board X 700 connected to the crossbar 100.

Resource information managed by the respective resource managing units represents an available capacity of the receive buffer 707 as resources. At the time of outputting data, when data is temporarily stored in the receive buffer 707, the available capacity decreases, and when the temporal storage of data is cancelled, the available capacity increases.

The port X arbiter unit 101b includes a port A resource checking unit 101b0, a port B resource checking unit 101b1, a port X inter-port arbiter unit 101b2, an output controller 101b3, and an arbitration information unit 101b4. The port A resource checking unit 101b0 refers to the resource information unit (for Q0) 101a0, the resource information unit (for Q1) 101a1, . . . , and the resource information unit (for Qn) 101an in response to request types of data requests received from the port A request queue 105a.

The port B resource checking unit 101b1 refers to the resource information unit (for Q0) 101a0, the resource information unit (for Q1) 101a1, . . . , and the resource information unit (for Qn) 101an in response to request types of data requests received from the port B request queue 105b.

The port A resource checking unit 101b0 outputs, when a queue corresponding to a data request is not in a busy state in the receive buffer 707, the data request to the port X inter-port arbiter unit 101b2. Similarly, the port B resource checking unit 101b1 outputs, when a queue corresponding to a data request is not in a busy state in the receive buffer 707, the data request to the port X inter-port arbiter unit 101b2.

The output controller 101b3 gives instructions to the port A data controller 106a or the port B data controller 106b so as to output data corresponding to a data request that won arbitration in the port X inter-port arbiter unit 101b2. The arbitration information unit 101b4 holds information indicative of priority rankings among ports or among request types used in arbitration in the port X inter-port arbiter unit 101b2.

The port A data controller 106a includes a data buffer 106a1 and a read controller 106a2. The port B data controller 106b includes a data buffer 106b1 and a read controller 106b2. The read controller 106a2 of the port A data controller 106a or the read controller 106b2 of the port B data controller 106b that receives instructions from the output controller 101b3 gives instructions to the data buffer 106a1 and the data buffer 106b1 so as to read out respective appropriate data.

The data buffer 106a1 and the data buffer 106b1 output the respective appropriate data to a port X data selector 102a and a port Y data selector 102b of the data crossbar 102.

The port Y resource managing unit 101c of the arbiter module 101 includes a resource information unit (for Q0) 101c0, a resource information unit (for Q1) 101c1, . . . , and a resource information unit (for Qn) 101cn. The resource information unit (for Q0) 101c0, the resource information unit (for Q1) 101c1, . . . , and the resource information unit (for Qn) 101cn, similarly to the resource information unit (for Q0) 101a0, the resource information unit (for Q1) 101a1, . . . , and the resource information unit (for Qn) 101an, acquire and manage respective usage of a queue Q0, a queue Q1, . . . , and a queue Qn for each type of request data in the receive buffer 807 of the I/O board Y 800 connected to the crossbar 100.

The port Y arbiter unit 101d includes a port A resource checking unit 101d0, a port B resource checking unit 101d1, a port Y inter-port arbiter unit 101d2, an output controller 101d3, and an arbitration information unit 101d4. The port A resource checking unit 101d0 refers to the resource information unit (for Q0) 101c0, the resource information unit (for Q1) 101c1, . . . , and the resource information unit (for Qn) 101cn in response to request types of data requests received from the port A request queue 105a.

The port B resource checking unit 101d1 refers to the resource information unit (for Q0) 101c0, the resource information unit (for Q1) 101c1, . . . , and the resource information unit (for Qn) 101cn in response to request types of data requests received from the port B request queue 105b.

The port A resource checking unit 101d0 outputs, when a queue corresponding to a data request is not in a busy state in the receive buffer 807, the data request to the port Y inter-port arbiter unit 101d2. Similarly, the port B resource checking unit 101d1 outputs, when a queue corresponding to a data request is not in a busy state in the receive buffer 807, the data request to the port Y inter-port arbiter unit 101d2.

The output controller 101d3 gives instructions to the port A data controller 106a or the port B data controller 106b so as to output data corresponding to a data request that won arbitration in the port Y inter-port arbiter unit 101d2.

The read controller 106a2 of the port A data controller 106a or the read controller 106b2 of the port B data controller 106b that receives instructions from the output controller 101d3 gives instructions to the data buffer 106a1 and the data buffer 106b1 so as to read out respective appropriate data. The data buffer 106a1 and the data buffer 106b1 output the respective appropriate data to the port X data selector 102a and the port Y data selector 102b of the data crossbar 102.

Arbitration Process and Problems in Conventional Technology

Figure 3:
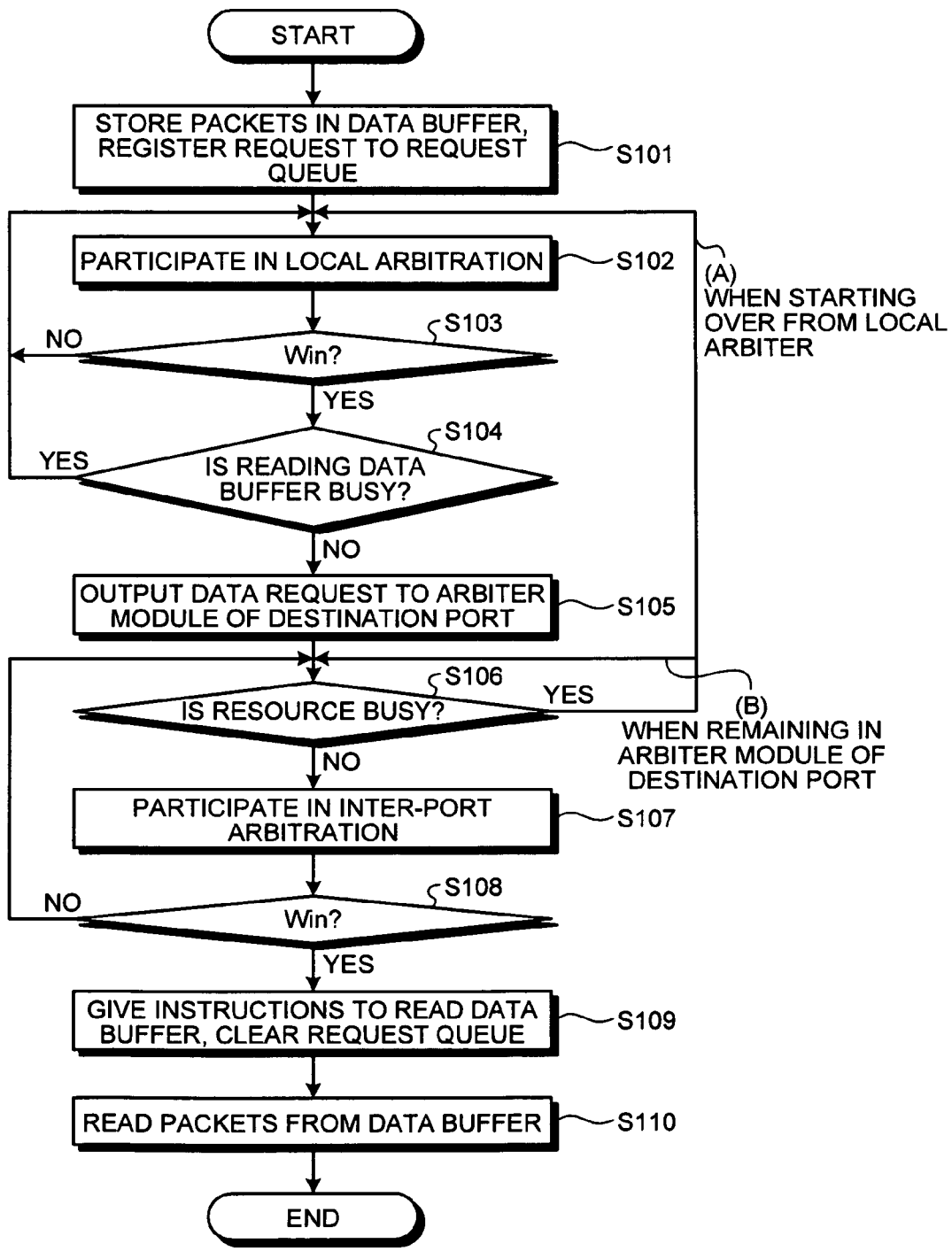
FIG. 3 is a flowchart illustrating a procedure of an arbitration process.

FIG. 3 is a flowchart illustrating a procedure of arbitration process performed in a conventional technology. In the followings, illustrated is an example of sending a data request of a request type Q0 from the system board A 500 to the port X via the port A 103. The same applies to the following examples of a first embodiment, a second embodiment, and a third embodiment.

At step S101, the crossbar 100 receives a data request of the request type Q0 and data (packets) from the system board A 500. More specifically, the port AQ0 105a00 of the port A request queue 105a in the crossbar 100 registers the data request of the request type Q0 from the system board A 500. The data buffer 106a1 of the port A data controller 106a stores therein the data (packets) corresponding to the data request of the request type Q0 from the system board A 500.

At step S102, the port AQ0 105a00 feeds the registered data request of the request type Q0 to the port A local arbiter unit 105a1 so as to make it participate in port A local arbitration carried out inside the port A request queue 105a. The port A local arbiter unit 105a1 that receives data requests carries out local arbitration inside the port A request queue 105a.

At step S103, the port A local arbiter unit 105a1 determines whether the data request received at step S102 wins the local arbitration. When winning is determined (Yes at step S103), the procedure moves on to step S104, and when winning is not determined (No at step S103), the procedure moves to step S102.

At step S104, the port A local arbiter unit 105a1 determines whether the read controller 106a2 of the port A data controller is in a busy state. When it is determined to be in a busy state (Yes at step S104), the procedure moves to step S102, and when it is not determined to be in a busy state (No at step S104), the procedure moves on to step S105.

At step S105, the port A local arbiter unit 105a1 outputs the data request that won the local arbitration from the destination determining unit 105a2 to an arbiter unit of a destination port (here, the port X arbiter unit 101b). The port A local arbiter unit 105a1 outputs the appropriate data request that is destined for the port X to the port A resource checking unit 101b0 of the port X arbiter unit 101b in the arbiter module 101.

At step S106, the port A resource checking unit 101b0 of the port X arbiter unit 101b in the arbiter module 101 refers to the resource information unit 101a0 of the port X resource managing unit 101a and determines whether the resources of the request type Q0 in the receive buffer 707 are in a busy state. When it is determined that the resources are in a busy state (Yes at step S106), the procedure moves to step S102 (or step S106), and when it is determined that the resources are not in a busy state (No at step S106), the procedure moves on to step S107.

At step S107, the port A resource checking unit 101b0 feeds the data request of the request type Q0 to the port X inter-port arbiter unit 101b2 so as to make it participate in port X inter-port arbitration carried out in the port X inter-port arbiter unit 101b2. The port X inter-port arbiter unit 101b2 that receives the data requests carries out port X inter-port arbitration in the port X inter-port arbiter unit 101b2.

At step S108, the port X inter-port arbiter unit 101b2 determines whether the data request of the request type Q0 wins the port X inter-port arbitration. When winning is determined (Yes at step S108), the procedure moves on to step S109, and when winning is not determined (No at step S108), the procedure moves to step S106.

At step S109, the port X inter-port arbiter unit 101b2 clears the queue of the data request of the request type Q0 registered in the port AQ0 105a00 that won the port X inter-port arbitration. The output controller 101b3 gives instructions to the read controller 106a2 of the port A data controller so as to output the data corresponding to the data request that won the port X inter-port arbitration.

At step S110, the read controller 106a2 reads out data (packets) corresponding to the appropriate data request destined for the port X from the data buffer 106a1 and outputs the data to the port X data selector 102a of the data crossbar 102 in response to the instructions from the output controller 101b3.

The respective processes of step S101, step S105, step S106, step S107, and step S109 described above are represented in FIG. 2 by the arrows indicated with respective step numbers given.

In the arbitration process in the conventional technology above, at step S106, when the port A resource checking unit 101b0 of the port X arbiter unit 101b in the arbiter module 101 refers to the resource information unit 101a0 of the port X resource managing unit 101a and the resources of the request type Q0 in the receive buffer 707 are in a busy state, the following two ways of handling the situation may be conceived.

(1) To cancel the data request and start the procedure from the local arbitration in the port A request queue 105a again (in FIG. 2, refer to the dashed arrow indicated by (A), and in FIG. 3, the procedure moves to step S102 when Yes at step S106).

(2) To continue inputting the data request repeatedly to the port A resource checking unit 101b0 of the port X arbiter unit 101b until the resource busy state of the receive buffer 707 is resolved (in FIG. 2, refer to the dashed arrow indicated by (B), and in FIG. 3, the procedure moves to step S106 when Yes at step S106).

However, there have been the following problems in (1) above. Specifically, (problem 1) when a resource busy state continues constantly, a live lock state could occur. More specifically, a situation is considered in which, at the timing of the resource information for the request type Q0 in the port X 113 being updated and resources used for sending data being secured, another data request from the port A 103 (for example, a request type Q1 destined for the port Y 118) is selected and a data request of the request type Q0 destined for the port X 113 from the port B 108 is selected.

In this case, the resources for the request type Q0 in the port X 113 are used by the port B 108 and thus the data request of the request type Q0 destined for the port X 113 from the port A 103 falls into a resource busy state again. When this state continues, even though the resources are sequentially released, for example, as in the port A 103, a live lock state results where a data request from a portion of a port is constantly not selected.

(problem 2) Inputting data requests not received due to lack of resources poses impediments to other valid data requests. Specifically, for example, because a local arbiter issues data requests without referring to the resource information of the port X 113, useless data requests could be output in vain. Accordingly, the port A request queue 105a has fewer opportunities to feed data requests of other request types that are not lacking in resources, and thus throughput could be deteriorated.

There has been the following problem in (2) above. Specifically, (problem 3) because a data request lacking in resources remains in the port X arbiter unit 101b, there is a likelihood of a deadlock or a significant deterioration of the throughput occurring.

For example, the resources for the request type Q0 in the port X 113 is assumed to have interdependent relationships with any of the other request types Q1 to Qn in the port X 113, or the request types Q0 to Qn in output ports different from the port X 113. When it is apparent in a protocol that a deadlock occurs if overtaking is not performed between specific request queues, the specific data request remains in the arbiter module 101 and thus other data requests that overtake in the port A local arbiter unit 105a1 has difficulty in being input, whereby the likelihood of a deadlock to occur further increases. If the specific data request does not remain in the arbiter module 101, there is a possible problem of a live lock to occur.

Regardless of the presence of the interdependent relationships of the request types above, in the period until the resources for the request type Q0 in the port X 113 are released, an opportunity to output request data of the other data request types Q1 to Qn from the port A 103 may be lost, thereby causing the deterioration of throughput. The disclosed technology is made to eliminate the problem 1 to the problem 3 above.

[a] First Embodiment

Figure 4:
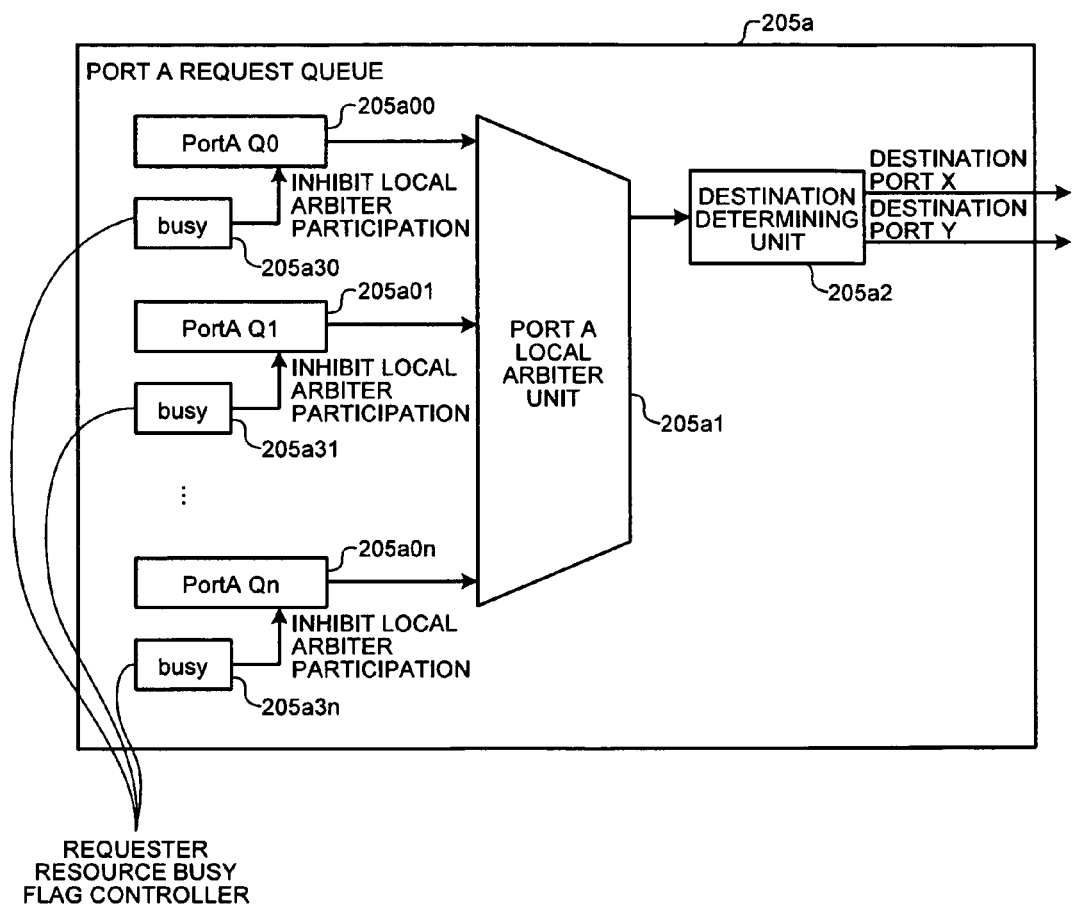
FIG. 4 is a block diagram illustrating a configuration of a port A request queue according to one example of a first embodiment of the disclosed technology.
Figure 5:
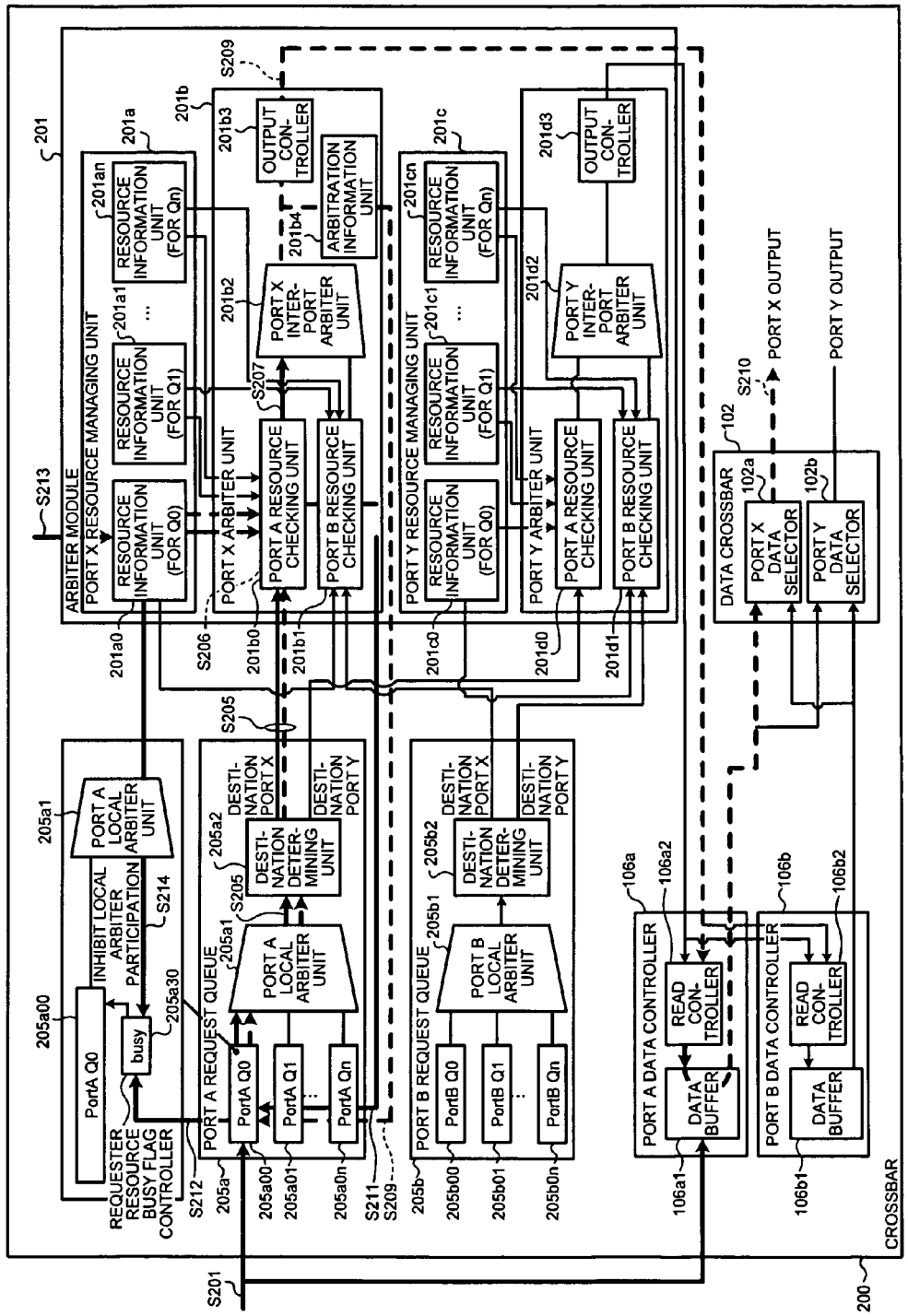
FIG. 5 is a block diagram illustrating a configuration of a crossbar according to the example of the first embodiment.
Figure 6:
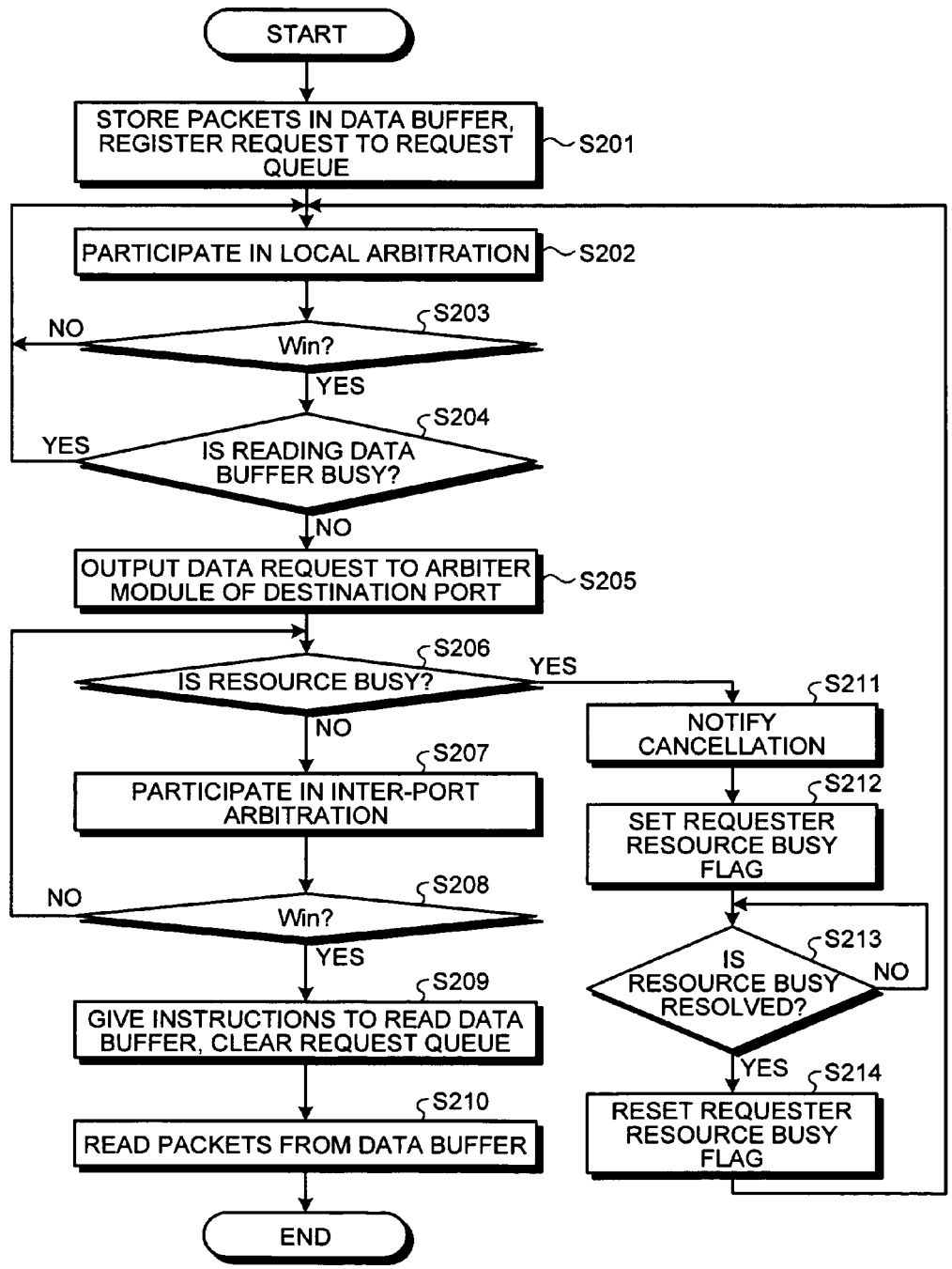
FIG. 6 is a flowchart illustrating a procedure of an arbitration process performed according to the example of the first embodiment.

With reference to FIGS. 4 to 6, one example of a first embodiment of the disclosed technology will be described. Respective functional units illustrated in block diagrams in FIGS. 4 and 5 having the same names except for differences in reference numerals have the same processing functions. A crossbar 200 according to the example of the first embodiment includes the port A request queue 205a and a port B request queue 205b, in place of the port A request queue 105a and the port B request queue 105b. Specifically, for example, it is characterized by including the port A request queue 205a in place of the port A request queue 105a. The same applies to the other request queues of respective request types.

As illustrated in FIG. 4, for example, the port A request queue 205a includes a port AQ0 205a00 to a port AQn 205a0n for the respective request types Q0 to Qn being connected with a requester resource busy flag controller 205a30 to a requester resource busy flag controller 205a3n, respectively. The port A request queue 205a includes a port A local arbiter unit 205a1, and a destination determining unit 205a2. The same applies to other input ports.

Furthermore, with reference to FIG. 5, when it is determined that a data request from the port AQ0 205a00 has difficulty in being output to a port X inter-port arbiter unit 201b2 due to resources being busy as a result of referring to a resource information unit 201a0 of a port X resource managing unit 201a, a port A resource checking unit 201b0 of a port X arbiter unit 201b gives instructions to the requester resource busy flag controller 205a30 of the port AQ0 205a00 so as to turn on a busy flag.

The port AQ0 205a00 inhibits outputting a data request as long as the busy flag is on. When the busy flag is off, the port AQ0 205a00 does not inhibit outputting a data request.

Arbitration Process According to Example of First Embodiment

FIG. 6 is a flowchart illustrating a procedure of an arbitration process performed according to the example of the first embodiment. The processes performed at step S201 to step S210 in FIG. 6 are almost the same as those of the procedure of the arbitration process illustrated in FIG. 3. The difference is a branching process at step S206.

At step S206, when the port A resource checking unit 201b0 of the port X arbiter unit 201b in an arbiter module 201 refers to the resource information unit 201a0 of the port X resource managing unit 201a and determines that the resources of the request type Q0 in the receive buffer 707 are in a busy state (Yes at step S206), the procedure moves on to step S211.

At step S211, the port A resource checking unit 201b0 notifies the port A request queue 205a of a cancellation notice. At step S212, the requester resource busy flag controller 205a30 sets a requester resource busy flag in response to the cancellation notice.

At step S213, the resource information unit 201a0 of the port X resource managing unit 201a determines whether the resource busy is resolved. When the resource busy is determined to be resolved (Yes at step S213), the procedure moves on to step S214, and when it is not determined to be resolved (No at step S213), the procedure moves to step S213. At step S214, upon receiving a notice that the resource busy is resolved from the resource information unit 201a0 of the port X resource managing unit 201a, the requester resource busy flag controller 205a30 resets the requester resource busy flag (turns it off). When this process is completed, the procedure moves to step S202.

The requester resource busy flag control in the example of the first embodiment allows the port AQ0 205a00 to know a busy state of resources for each request type and thus restrains outputting a data request with high probability of losing an inter-port arbitration. This makes it possible to resolve the above-described problem 2.

[b] Second Embodiment

With reference to FIGS. 7 to 10, one example of a second embodiment of the disclosed technology will be described. Respective functional units illustrated in block diagrams in FIGS. 7 and 8 that have the same names except for differences in reference numerals have the same processing functions. In a crossbar 300 according to the example of the second embodiment, in addition to the configuration of the crossbar 200 according to the example of the first embodiment, a port X arbiter unit 301b of an arbiter module 301 further includes a resource release waiting flag storage unit 301b5.

Figure 7:
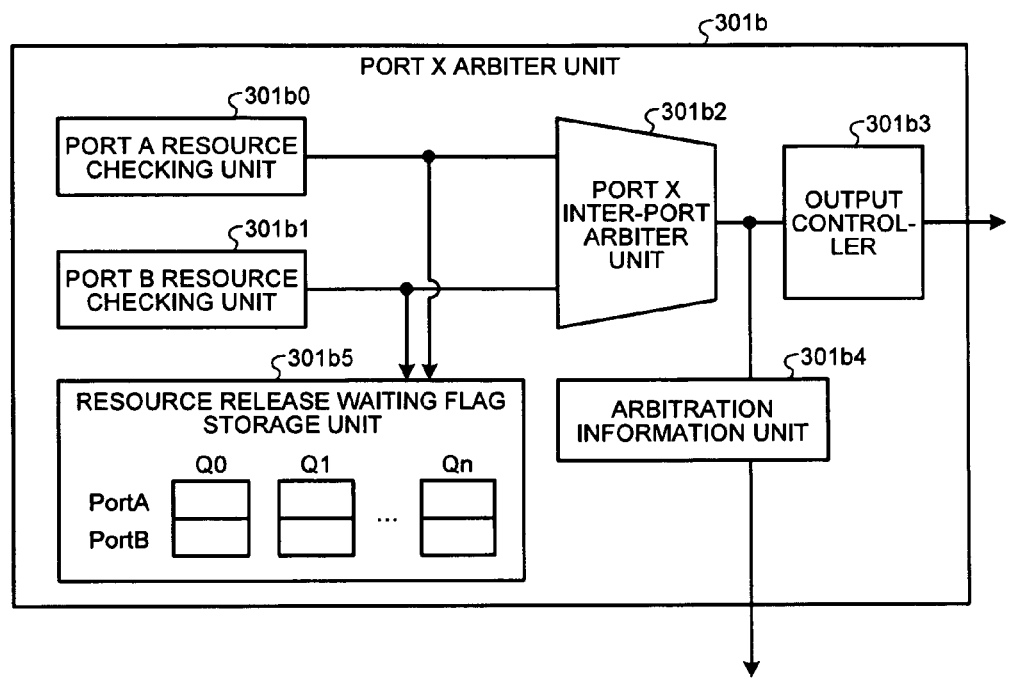
FIG. 7 is a block diagram illustrating a configuration of a port A arbiter unit according to one example of a second embodiment of the disclosed technology.
Figure 8:
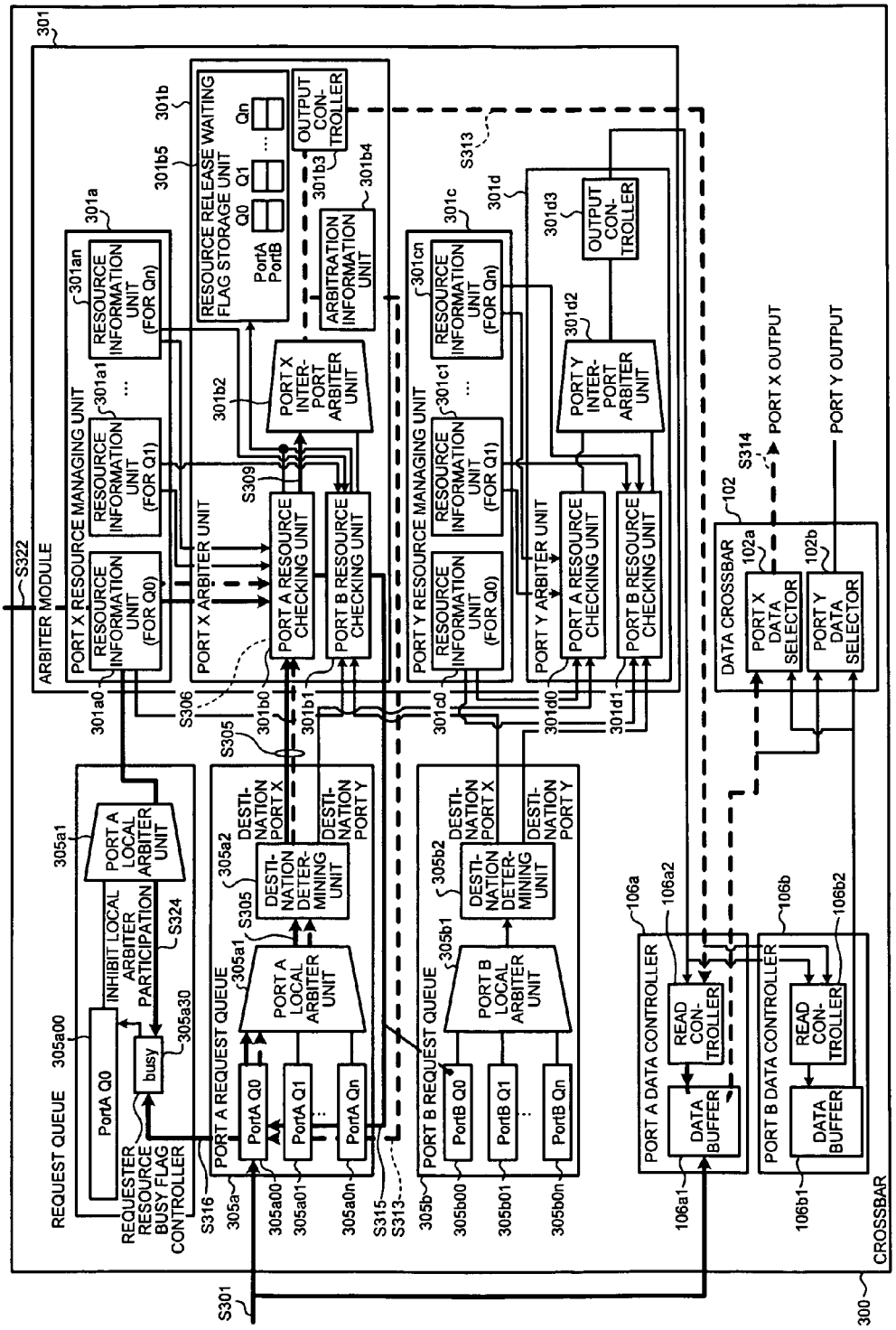
FIG. 8 is a block diagram illustrating a configuration of a crossbar according to the example of the second embodiment.

The resource release waiting flag storage unit 301b5 holds, as illustrated in FIGS. 7 and 8, a resource release waiting flag for each request type and for each input port. The resource release waiting flag storage unit 301b5 sets (turns on) a resource release waiting flag when a lack of resources is detected in resource check in an output port.

When a resource release waiting flag for a request type in any input port is set, a data request from other input ports that are not set with a resource release waiting flag is assumed to be in a resource busy state even though it is not in a resource busy state. Accordingly, this prevents a new data request from winning arbitration before the preceding input port waiting for resource release does. In other words, the sequence of resource release waiting is retained.

A port A resource checking unit 301b0 cancels a data request when a lack of resources for a corresponding request type is detected. When a lack of resources for the corresponding request type is not detected, the port A resource checking unit 301b0 feeds the data request to a port X inter-port arbiter unit 301b2. Accordingly, a data request is made to remain in the arbiter module 301 when resources are not lacking. This eliminates the need for starting over the procedure from a local arbiter again. Consequently, a data request of high probability of outputting may participate in an inter-port arbitration efficiently.

When a resource information unit 301a0 of the port X resource managing unit recognizes that resource information is updated and a lack of resources is resolved, the resource information unit 301a0 resets (turns off) a requester resource busy flag for an appropriate request type of an input port that retains a data request of the highest priority based on information in the resource release waiting flag storage unit 301b5 and arbitration information held in an arbitration information unit 301b4.

A resource release waiting flag held in the resource release waiting flag storage unit 301b5 is reset at the time the data request is selected at the port X inter-port arbiter unit 301b2 coming through a port A local arbiter unit 305a1 again because the requester resource busy flag is reset. When resetting a resource release waiting flag, if resources are left and other resource release waiting flags remain, the resource information unit 301a0 resets a requester resource busy flag for an appropriate request type of an input port of the next highest priority.

Arbitration Process According to Example of Second Embodiment

Figure 9:
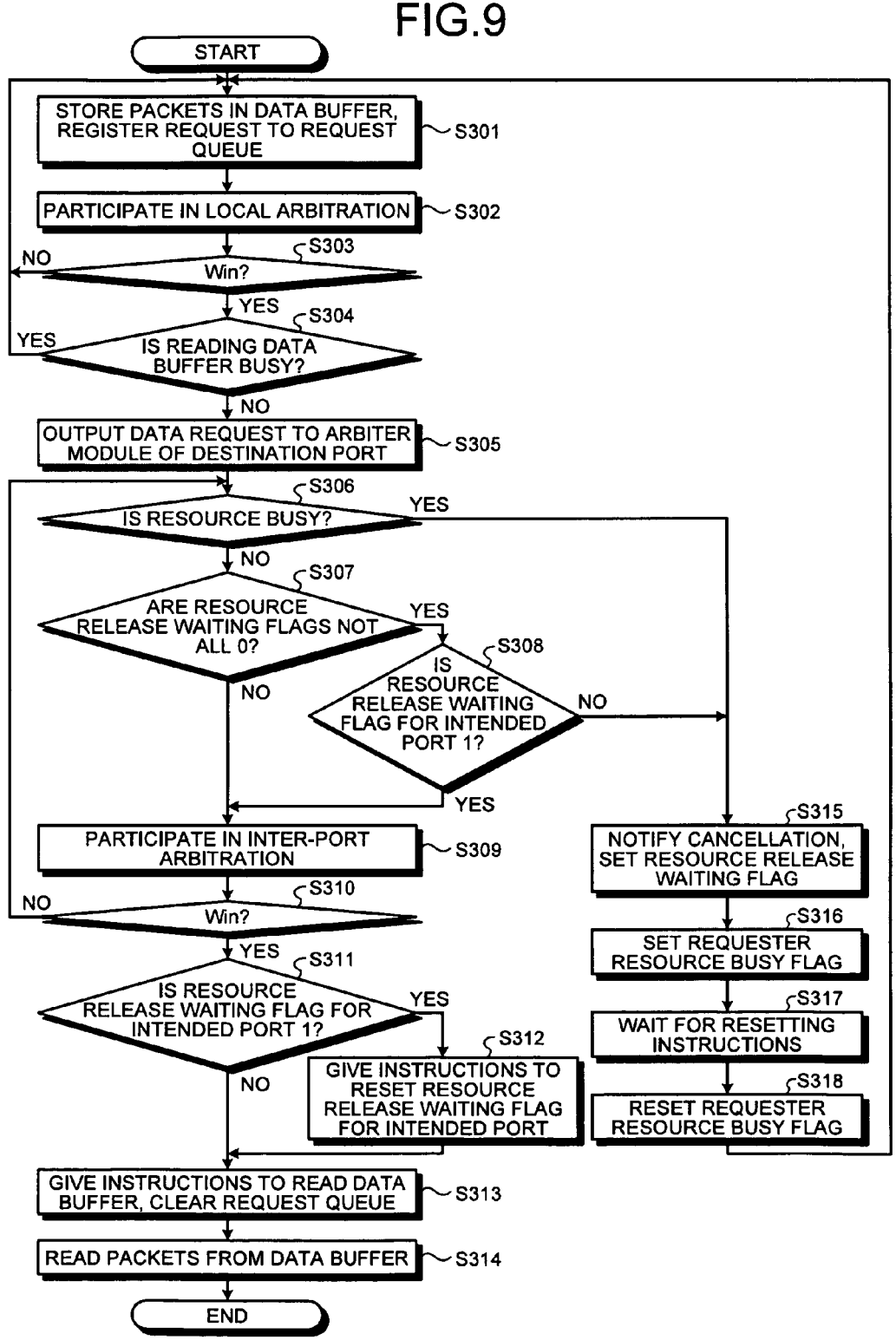
FIG. 9 is a flowchart illustrating a procedure of an arbitration process performed according to the example of the second embodiment.

FIG. 9 is a flowchart illustrating a procedure of an arbitration process performed according to the example of the second embodiment. At step S301 to step S306, the same processes as those of the above-described step S101 to step S106 are carried out. When Yes at step S306, the procedure moves on to step S315, and when No at step S306, the procedure moves on to step S307.

At step S307, the port A resource checking unit 301b0 refers to the resource release waiting flag storage unit 301b5 and determines whether resource release waiting flags are all off (0). When it is determined that the resource release waiting flags are not all off (0) (Yes at step S307), the procedure moves on to step S308, and when it is determined that the resource release waiting flags are all off (0) (No at step S307), the procedure moves on to step S309.

At step S308, the port A resource checking unit 301b0 determines whether a resource release waiting flag for an intended port is on (1). When it is determined that the resource release waiting flag for the intended port is on (1) (Yes at step S308), the procedure moves on to step S309, and when it is determined that the resource release waiting flag for the intended port is not on (1) (No at step S308), the procedure moves on to step S315.

At step S309 and step S310, the same processes as those of the above-described step S107 and step S108 are carried out, respectively. At step S311, the port X inter-port arbiter unit 301b2 determines whether a resource release waiting flag for an appropriate request type of a port that won arbitration is on (1). When it is determined that the resource release waiting flag for the appropriate request type of the port that won the arbitration is on (1) (Yes at step S311), the procedure moves on to step S312, and when it is determined that the resource release waiting flag for the appropriate request type of the port that won the arbitration is not on (1) (No at step S311), the procedure moves on to step S313.

At step S312, the port X inter-port arbiter unit 301b2 gives instructions to the resource release waiting flag storage unit 301b5 so as to reset the resource release waiting flag for the appropriate request type of the intended port. In response to the instructions, the resource release waiting flag storage unit 301b5 resets the resource release waiting flag for the intended port. At step S313 and step S314, the same processes as those of the above-described step S109 and step S110 are carried out, respectively.

Meanwhile, at step S315, the port A resource checking unit 301b0 notifies a port A request queue 305a of cancelling the data request and gives instructions to the resource release waiting flag storage unit 301b5 so as to set a resource release waiting flag for the intended port. In response to the instructions, the resource release waiting flag storage unit 301b5 sets the resource release waiting flag for the intended port. At step S316, a requester resource busy flag controller 305a30 sets a requester resource busy flag in response to the cancellation notice. At step S317, the requester resource busy flag controller 305a30 waits for resetting instructions based on the information of the resource information unit 301a0 of the port X resource managing unit being updated. At step S318, the same process as that of the above-described step S214 is carried out.

Figure 10:
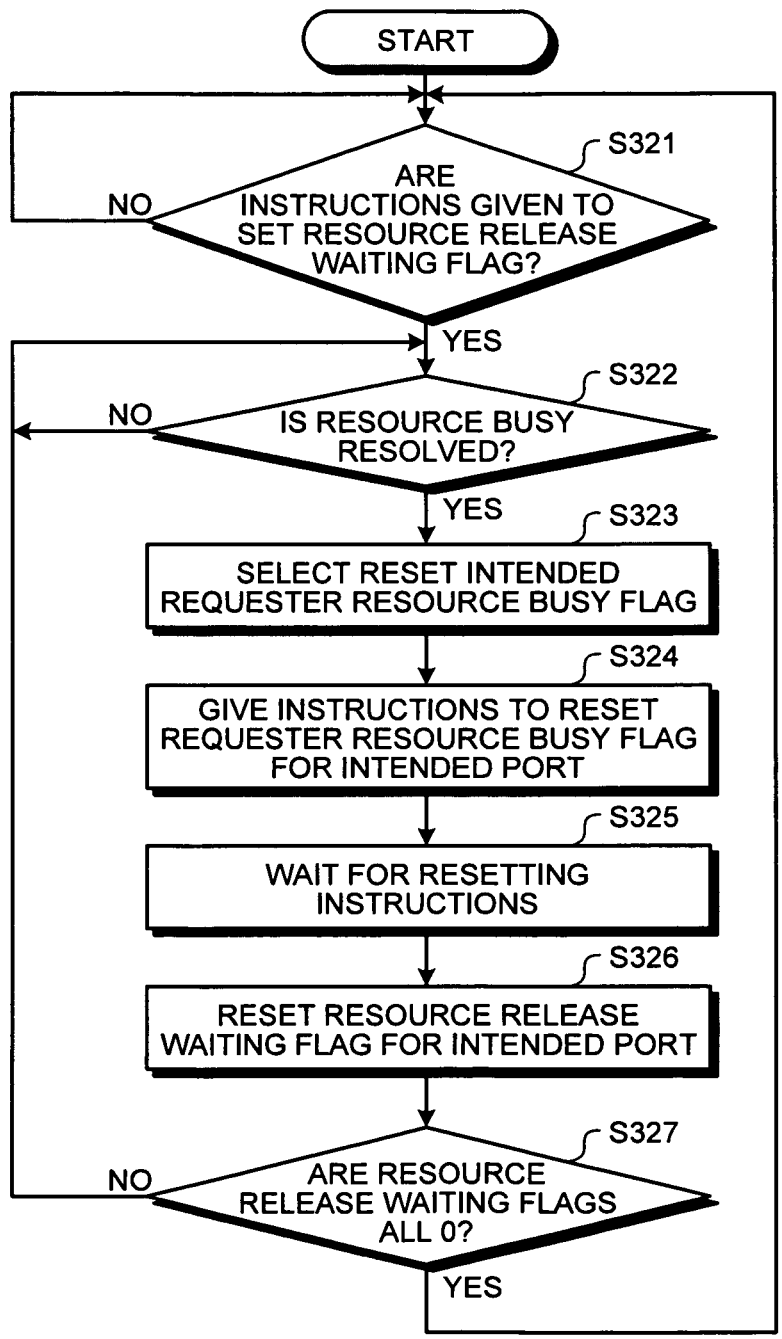
FIG. 10 is a flowchart illustrating a procedure of a resource release waiting flag control process performed according to the example of the second embodiment.

Resource Release Waiting Flag Control Process According to Example of Second Embodiment FIG. 10 is a flowchart illustrating a procedure of a resource release waiting flag control process performed according to the example of the second embodiment. At step S321, the resource release waiting flag storage unit 301b5 waits for flag setting instructions from any of the resource checking units. When setting instructions for any of the resource release waiting flags are not given (No at step S321), the procedure moves to step S321. When setting instructions for any of the resource release waiting flags are given (Yes at step S321), the procedure moves on to step S322.

At step S322, the resource information unit 301a0 of the port X resource managing unit determines whether a resource busy is resolved. When it is determined that the resource busy is resolved (Yes at step S322), the procedure moves on to step S323, and when it is determined that the resource busy is not resolved (No at step S322), the procedure moves to step S322.

At step S323, the resource information unit 301a0 of the port X resource managing unit selects a data request of a reset intended requester resource busy flag in response to a type of data request and information of the arbitration information unit 301b4 and the resource release waiting flag storage unit 301b5 of an output port. At step S324, the resource information unit 301a0 of the port X resource managing unit gives instructions to the requester resource busy flag controller 305a30 of the intended port to reset the requester resource busy flag. As a result of the process performed at step S324, the above-described step S318 is carried out.

At step S325, the resource information unit 301a0 of the port X resource managing unit waits for resetting instructions for a resource release waiting flag of an intended port at step S312. At step S326, in response to the instructions of the above-described step S312, the resource information unit 301a0 resets the appropriate resource release waiting flag in the resource release waiting flag storage unit 301b5.

At step S327, the resource information unit 301a0 of the port X resource managing unit determines whether all of the resource release waiting flags in the resource release waiting flag storage unit 301b5 are off (0). When it is determined that the resource release waiting flags are all off (0) (Yes at step S327), the processing is moved to step S321, and when it is determined that the resource release waiting flags are not all off (0) (No at step S327), the processing is moved to step S322.

The resource release waiting flag control in the example of the second embodiment allows a data request to participate in an inter-port arbitration again for a port to be prioritized, at the timing when it is assured that resources are secured for an input port of resource release waiting, using information of the arbitration information unit 301b4 and the resource release waiting flag storage unit 301b5. This makes it possible to resolve the above-described problem 1.

[c] Third Embodiment

With reference to FIGS. 11 to 16, one example of a third embodiment of the disclosed technology will be described. Respective functional units illustrated in block diagrams in FIGS. 11 to 13 that have the same names except for differences in reference numerals have the same processing functions. A crossbar 400 according to the example of the third embodiment includes, in addition to the configuration of the crossbar 300 according to the example of the second embodiment, a live lock monitoring timer for each of request queues of the respective request types, and is configured to activate a live lock preventing circuit when a counted value of the live lock monitoring timer exceeds a live lock monitoring threshold.

Live Lock Monitoring Timer

Figure 11:
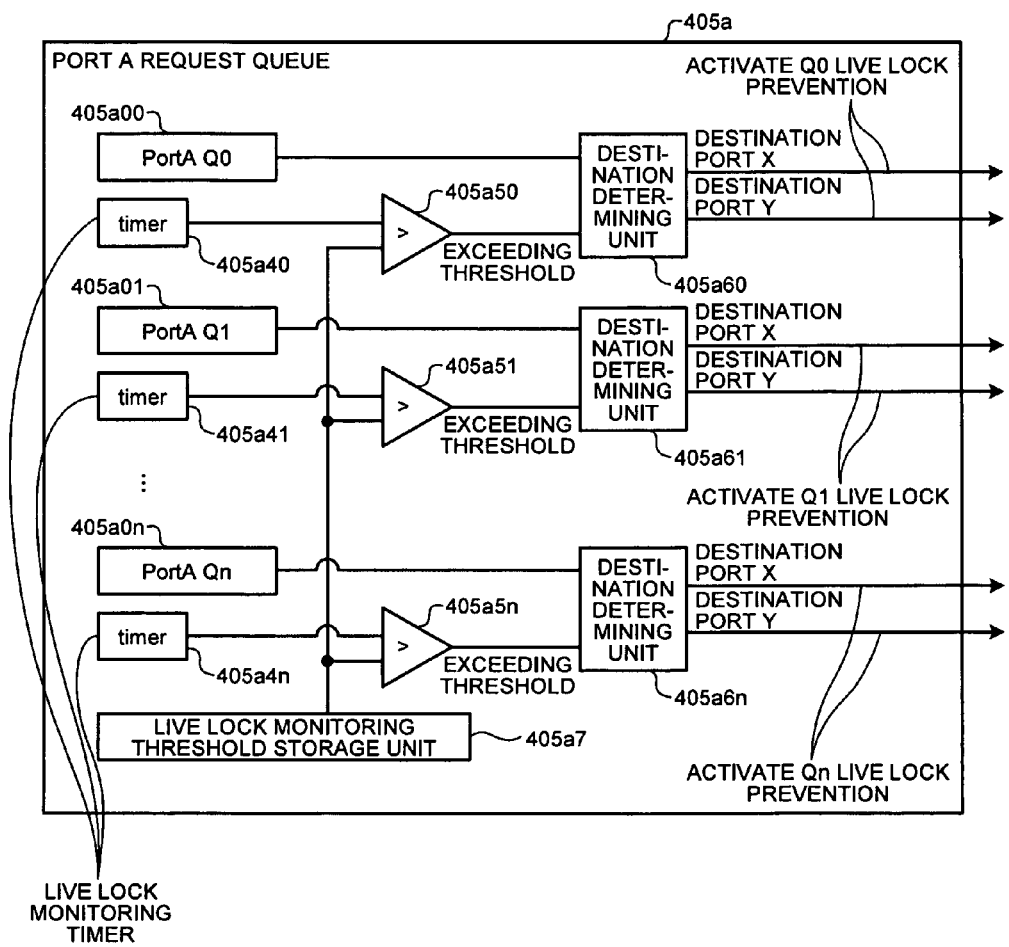
FIG. 11 is a block diagram illustrating a configuration of a port A request queue according to one example of a third embodiment of the disclosed technology.
Figure 13:
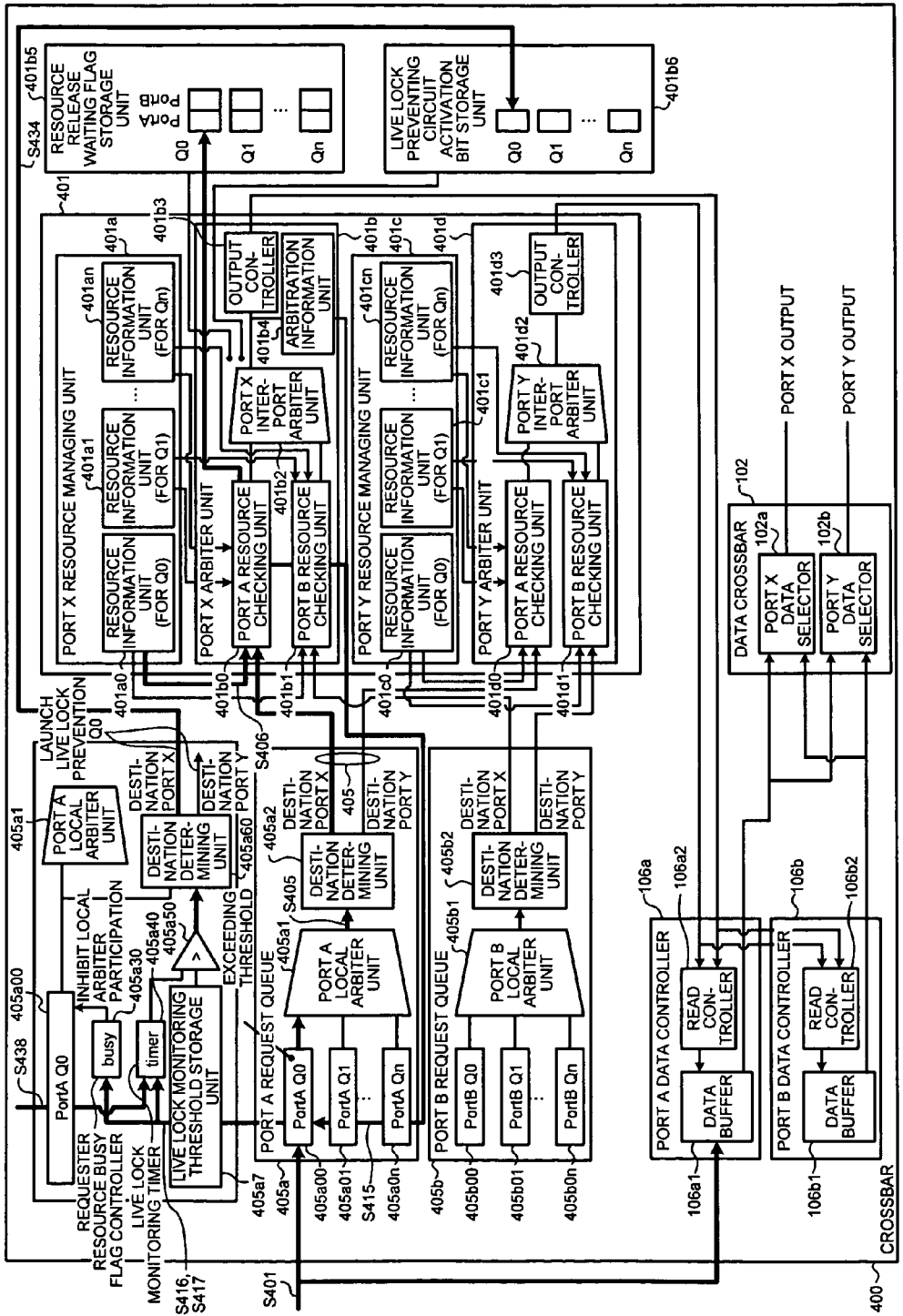
FIG. 13 is a block diagram illustrating a configuration of a crossbar according to the example of the third embodiment.

As illustrated in FIGS. 11 and 13, a port AQ0 405a00 of a port A request queue 405a further includes a live lock monitoring timer 405a40, a comparator 405a50, and a destination determining unit 405a60. Similarly, a port AQ1 405a01 further includes a live lock monitoring timer 405a41, a comparator 405a51, and a destination determining unit 405a61. Similarly, a port AQn 405a0n further includes a live lock monitoring timer 405a4n, a comparator 405a5n, and a destination determining unit 405a6n. The port A request queue 405a includes a live lock monitoring threshold storage unit 405a7 being connected to the comparator 405a50, the comparator 405a51, and the comparator 405a5n.

The live lock monitoring timer, as illustrated in FIGS. 11 and 13, will be explained with an example of the port AQ0 405a00. The live lock monitoring timer 405a40 starts time counting when a port A resource checking unit 401b0 cancels a request due to resources being busy, and feeds a timer result to the comparator 405a50. The comparator 405a50 constantly compares a given threshold of time stored in the live lock monitoring threshold storage unit 405a7 with the timer result received. When the timer result exceeds the given threshold of time, the comparator 405a50 gives instructions to the destination determining unit 405a60 so as to determine a destination of a data request of the request type Q0 output from the port AQ0 405a00 and to activate a live lock prevention function for the data request of the request type Q0 in an output port of the destination.

The timing of resetting timer of the live lock monitoring timer 405a40 is when an intended data request is selected in a port X inter-port arbiter unit 401b2.

Live Lock Preventing Circuit Activation Bit Storage Unit

Figure 12:
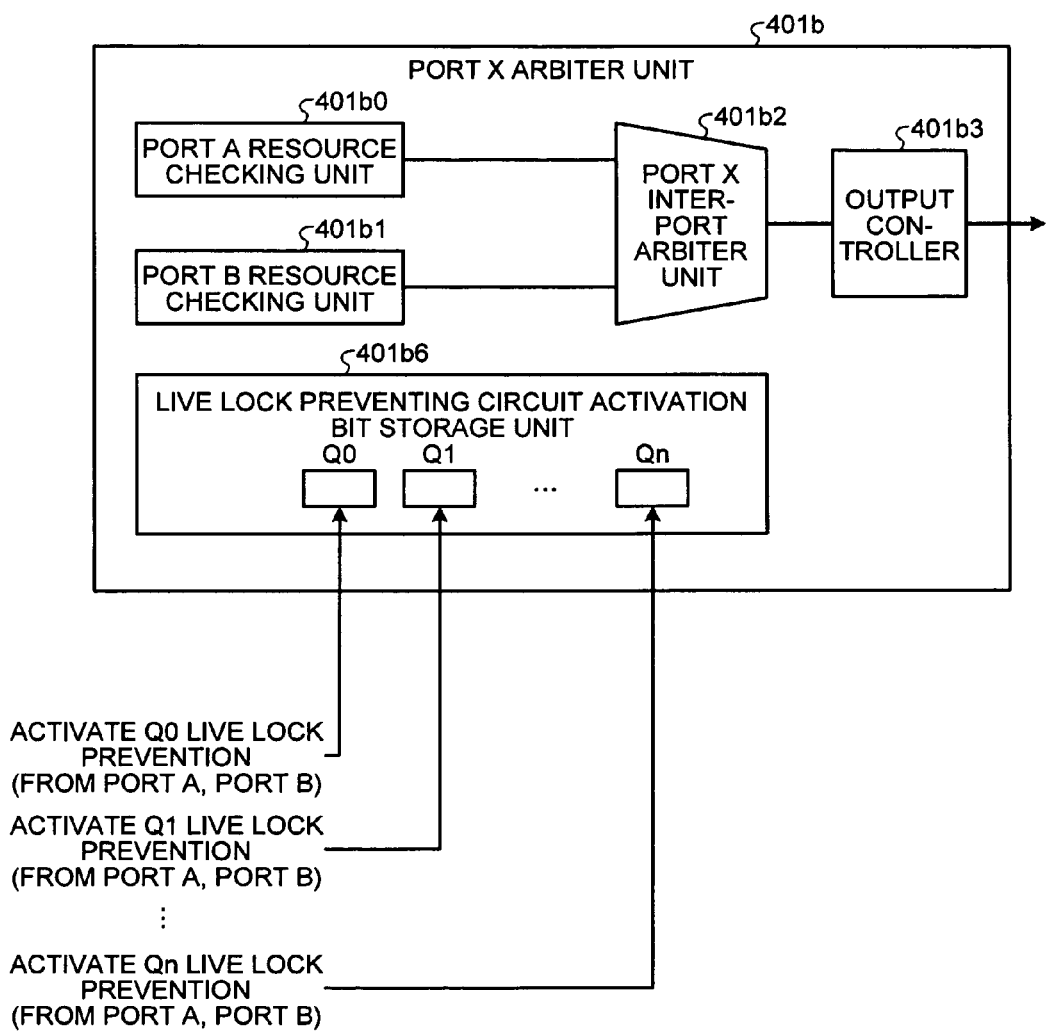
FIG. 12 is a block diagram illustrating a configuration of a port X arbiter unit according to the example of the third embodiment.

As illustrated in FIGS. 12 and 13, a port X arbiter unit 401b further includes a live lock preventing circuit activation bit storage unit 401b6. The live lock preventing circuit activation bit storage unit 401b6 of the port X arbiter unit 401b stores therein a live lock preventing circuit activation bit that activates a live lock preventing circuit for each request type. The live lock preventing circuit activation bit is set with a bit (1) based on a signal output from the destination determining unit 405a60 of the port A request queue by determining an output port.

Until a live lock preventing circuit activation bit is set, data requests from input ports in which resource release waiting flags are not set are not regarded as resources being busy. When it is recognized that a resource busy is resolved, all the requester resource busy flags and the resource release waiting flags for a corresponding input port are reset. Furthermore, the port X inter-port arbiter unit 401b2 selects a request detected as in a live lock state by a live lock monitoring timer and thus the live lock monitoring timer is reset, and the comparator 405a50 no longer detects exceeding a threshold. Consequently, the live lock preventing circuit activation bit is reset.

Arbitration Process According to Example of Third Embodiment

Figure 14:
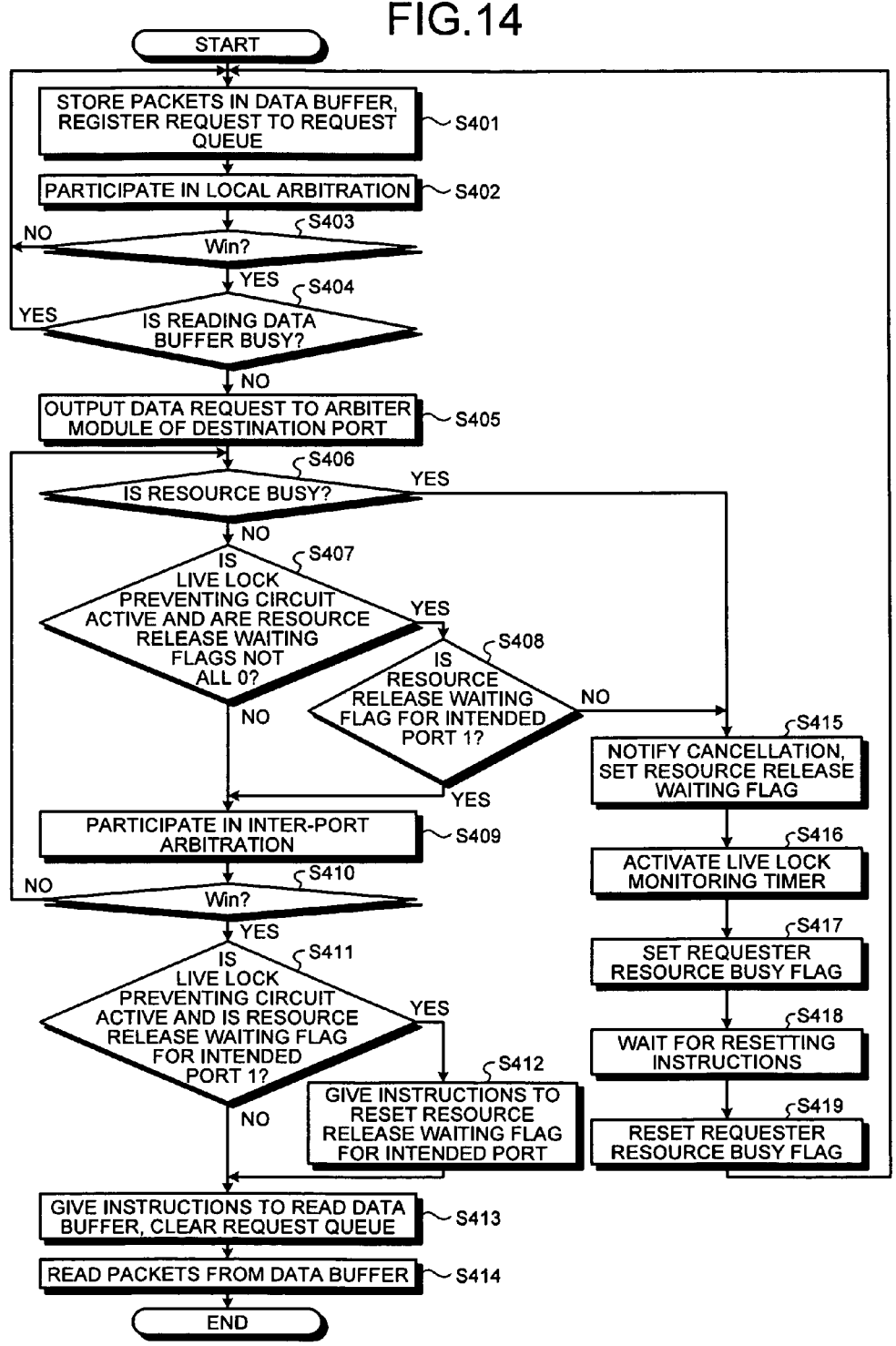
FIG. 14 is a flowchart illustrating a procedure of an arbitration process performed according to the example of the third embodiment.

FIG. 14 is a flowchart illustrating a procedure of an arbitration process performed according to the example of the third embodiment. The processes performed at step S401 to step S406 in FIG. 14 are the same as those of step S301 to step S306 in the procedure of the arbitration process of the example of the second embodiment illustrated in FIG. 9, respectively.

At step S407, the port A resource checking unit 401b0 determines whether the live lock preventing circuit is active and whether resource release waiting flags are not all off (0). When it is determined that the live lock preventing circuit is active and the resource release waiting flags are not all off (0) (Yes at step S407), the procedure moves to step S408, and when it is not determined that the live lock preventing circuit is active and the resource release waiting flags are not all off (0) (No at step S407), the procedure moves on to step S409.

The processes performed at step S408, step S409, and step S410 in FIG. 14 are the same as those of step S308, step S309, and step S310 in the procedure of the arbitration process of the example of the second embodiment illustrated in FIG. 9, respectively. When Yes is determined at step S410, the procedure moves on to step S411, and when No is determined at step S410, the procedure moves to step S406.

At step S411, the port X inter-port arbiter unit 401b2 determines whether the live lock preventing circuit is active and a resource release waiting flag for a port that won arbitration is on (1). When it is determined that the live lock preventing circuit is active and the resource release waiting flag for the port that won the arbitration is on (1) (Yes at step S411), the procedure moves on to step S412, and when it is not determined that the live lock preventing circuit is active and the resource release waiting flag for the port that won the arbitration is on (1) (No at step S411), the procedure moves on to step S413. The processes performed at step S412 to step S414 in FIG. 14 are the same as those of step S312 to step S314 in the procedure of the arbitration process of the example of the second embodiment illustrated in FIG. 9, respectively.

Meanwhile, the process performed at step S415 in FIG. 14 is the same as that of step S315 in the procedure of the arbitration process of the example of the second embodiment illustrated in FIG. 9. At step S416, the port A resource checking unit 401b0 gives instructions to a live lock monitoring timer to start time counting. The processes performed at step S417 to step S419 in FIG. 14 are the same as those of step S316 to S318 in the procedure of the arbitration process of the example of the second embodiment illustrated in FIG. 9, respectively. When the process at step S419 is completed, the procedure moves to step S401.

Figure 15:
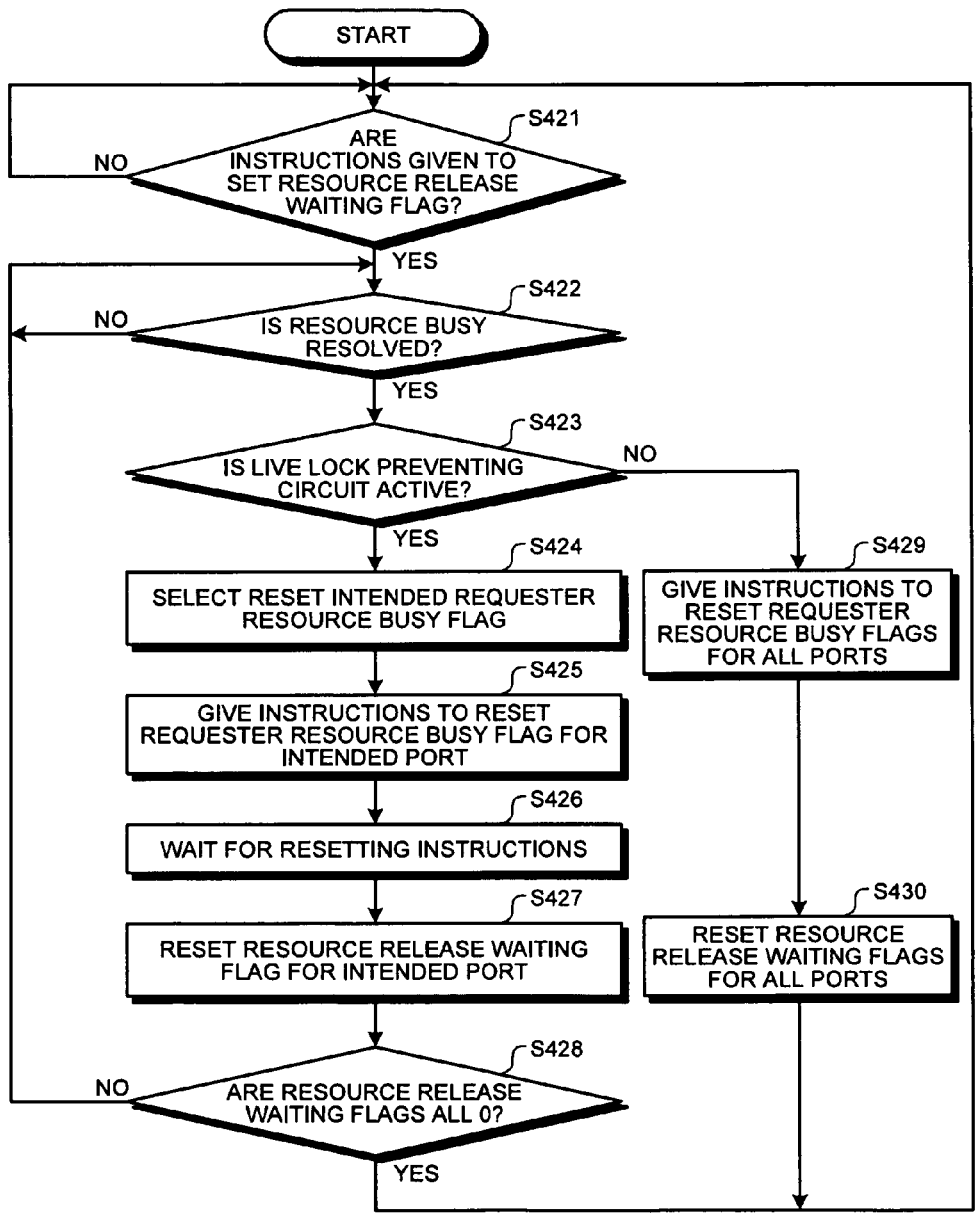
FIG. 15 is a flowchart illustrating a procedure of a resource release waiting flag control process performed according to the example of the third embodiment.

Resource Release Waiting Flag Control Process According to Example of Third Embodiment FIG. 15 is a flowchart illustrating a procedure of a resource release waiting flag control process according to the example of the third embodiment. The processes performed at step S421 and step S422 in FIG. 15 are the same as those of step S321 and step S322 in the procedure of the resource release waiting flag control process of the example of the second embodiment illustrated in FIG. 10, respectively.

At step S423, a resource information unit 401a0 of the port X resource managing unit refers to the live lock preventing circuit activation bit storage unit 401b6 and determines whether the live lock preventing circuit activation bit is set and thus the live lock preventing circuit is active. When it is determined that the live lock preventing circuit is active (Yes at step S423), the procedure moves on to step S424, and when it is determined that the live lock preventing circuit is not active (No at step S423), the procedure moves on to step S429.

The processes performed at step S424 to step S428 in FIG. 15 are the same as those of step S323 to step S327 in the procedure of the resource release waiting flag control process of the example of the second embodiment illustrated in FIG. 10, respectively.

Meanwhile, at step S429, the resource information unit 401a0 of the port X resource managing unit gives instructions to reset requester resource busy flags for all ports. At step S430, the resource information unit 401a0 of the port X resource managing unit gives instructions to reset resource release waiting flags for all ports. When this process is completed, the processing is moved to step S421.

Figure 16:
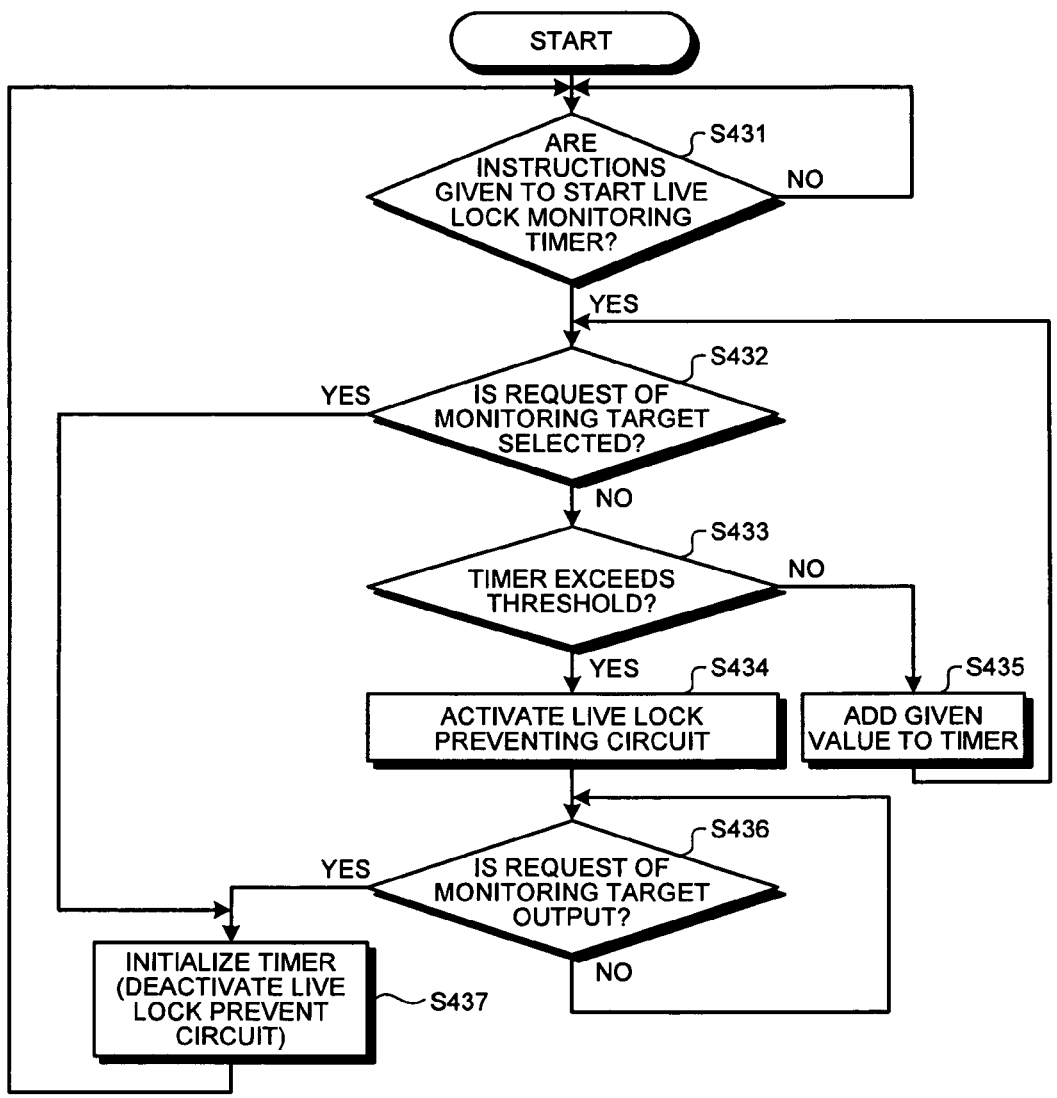
FIG. 16 is a flowchart illustrating a procedure of a live lock preventing circuit control process performed according to the example of the third embodiment.

Live Lock Preventing Circuit Control Process According to Example of Third Embodiment FIG. 16 is a flowchart illustrating a procedure of a live lock preventing circuit control process according to the example of the third embodiment. At step S431, the live lock monitoring timer 405a40 waits for a monitoring timer to be started by the process performed at step S416. When the live lock monitoring timer 405a40 is started (Yes at step S431), the procedure moves on to step S432, and when the live lock monitoring timer 405a40 is not started (No at step S431), the procedure moves to step S431.

At step S432, the live lock monitoring timer 405a40 determines whether a data request of intended monitoring is selected by the port X inter-port arbiter unit 401b2. When it is determined that the data request of the intended monitoring is selected by the port X inter-port arbiter unit 401b2 (Yes at step S432), the procedure moves on to step S437, and when it is determined that the data request of the intended monitoring is not selected by the port X inter-port arbiter unit 401b2 (No at step S432), the procedure moves to step S433.

At step S433, the comparator 405a50 determines whether a time value counted by a live lock monitoring timer 405a40 exceeds the live lock monitoring threshold stored in the live lock monitoring threshold storage unit 405a7. When it is determined to be exceeding the live lock monitoring threshold (Yes at step S433), the procedure moves on to step S434, and when it is not determined to be exceeding the live lock monitoring threshold (No at step S433), the procedure moves on to step S435.

At step S434, the live lock monitoring timer 405a40 sets a live lock preventing circuit activation bit of the live lock preventing circuit activation bit storage unit 401b6 for each request type through the destination determining unit 405a60 so as to activate the live lock preventing circuit. In contrast, at step S435, the live lock monitoring timer 405a40 adds a given value (for example, 1) to the time value counted. When this process is completed, the procedure moves to step S432.

At step S436, the live lock monitoring timer 405a40, after activating the live lock preventing circuit, determines whether the data request of the intended monitoring is selected by the port X inter-port arbiter unit 401b2. When it is determined that the data request of the intended monitoring is selected by the port X inter-port arbiter unit 401b2 (Yes at step S436), the procedure moves on to step S437, and when it is determined that the data request of the intended monitoring is not selected by the port X inter-port arbiter unit 401b2 (No at step S436), the procedure moves to step S436.

At step S437, the live lock monitoring timer 405a40 corresponding to the request, which is selected by the port X inter-port arbiter unit 401b2, is initialized (reset). When the live lock monitoring timer 405a40 is initialized, the comparator 405a50 no longer detects exceeding the threshold and thus the live lock preventing circuit activation bit in the live lock preventing circuit activation bit storage unit 401b6 for each request type is reset, whereby the live lock preventing circuit is deactivated. When this process is completed, the procedure moves to step S431.

With the resource release waiting flag control process according to the example of the third embodiment and the live lock preventing circuit control process according to the example of the third embodiment, the activation of the live lock preventing circuit that includes a requester resource busy flag controller 405a30, a resource release waiting flag storage unit 401b5, and the port A resource checking unit 401b0 controlling the foregoing units is inhibited when resources being busy occurs in a short period of time until the counted time of the live lock monitoring timer exceeds the live lock monitoring threshold. When resources being busy is detected in a state in which there is no danger of occurring a live lock, the operation of the live lock preventing circuit is inhibited, and thus the deterioration in throughput of data transfer in the crossbar 400 may be prevented.

While the embodiments of the present invention have been described above, the invention is not restricted to those and may be implemented in various different embodiments within the scope of technical ideas described in claims. Furthermore, the effects described in the embodiments are not restricted to those.

In each of the processes described in the embodiments, the whole or a part of the process described to be carried out automatically may be carried out manually, or the whole or a part of the process described to be carried out manually may be carried out automatically by a known method. In addition, the processing procedure, the control procedure, the specific names, and the information including various types of data and parameters indicated in the above-described embodiments may be changed optionally, unless otherwise noted specifically.

Each of the constituent elements of each device illustrated in the drawings is functionally conceptual and is not necessarily configured physically as illustrated in the drawings. In other words, the specific embodiments of distribution and integration of devices are not restricted to those illustrated, and the whole or a part thereof may be configured by being functionally or physically distributed or integrated in any unit in accordance with various types of loads and usage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transfer circuit being connected to transmitting circuits and receiving circuits and carrying out data transfer between the transmitting circuits and the receiving circuits, the data transfer circuit comprising:
    a first arbitration unit that receives a plurality of data requests input from a port connected to one of the transmitting circuits, and selects a single data request by arbitration from the plurality of data requests;
    a second arbitration unit that receives the single data request selected by the first arbitration unit and other data request input from other port, and selects a data request for the data transfer by arbitration from the single data request and the other data request;
    a receive resource usage monitoring unit that monitors usage of receive resources of a receiving circuit receiving data corresponding to the data request for the data transfer selected by the second arbitration unit;
    a controller that outputs the single data request selected by the first arbitration unit to the second arbitration unit, when the usage of the receive resources monitored by the receive usage monitoring unit is not in a busy state;
    a data transfer unit that carries out the data transfer according to the data request selected by the second arbitration unit;

a busy state resolution waiting information storage unit that stores therein busy state resolution waiting information of usage of the receive resources for each of the transmitting circuits and for each type of the data requests, and a busy state resolution waiting controller that, when the busy state resolution waiting information for any of the transmitting circuits is stored in the busy state resolution waiting information storage unit, sets usage of the receive resources in a busy state for a data request of a same type as appropriate data requests of all of the transmitting circuits, wherein the controller cancels output of the single data request selected by the first arbitration unit to the second arbitration unit and inhibits input of a data request corresponding to the single data request to the first arbitration unit, when the usage of the receive resources monitored by the receive resource usage monitoring unit is in the busy state.

2. The data transfer circuit according to claim 1, wherein the busy state resolution waiting controller sets the busy state resolution waiting information when the receive resources are detected to be in a busy state by the receive resource usage monitoring unit while the second arbitration unit is arbitrating the data requests, and resets the busy state resolution waiting information when the second arbitration unit selects the data request.

3. The data transfer circuit according to claim 2, further comprising:

a timer that starts time counting when output of the single data request to the second arbitration unit is canceled because usage of the receive resources monitored for each of the transmitting circuits and for each type of the data requests by the receive resource usage monitoring unit is in a busy state and stops time counting when the single data request is selected by the second arbitration unit, and a function activating unit that activates a function of the busy state resolution waiting controller when a time counted by the timer exceeds a given threshold.

4. A data transfer method by which a data transfer circuit being connected to transmitting circuits and receiving circuits carries out data transfer between the transmitting circuits and the receiving circuits, the data transfer method comprising:

first arbitrating including receiving a plurality of data requests input from a port connected to one of the transmitting circuits, and selecting a single data request by arbitration from the plurality of data requests;

monitoring usage of receive resources of a receiving circuit receiving data corresponding to a data request requesting the data transfer;

controlling whether to output the single data request selected at the first arbitrating, based on the usage of the receive resources monitored at the monitoring;

second arbitrating including receiving the single data request output on the basis of a result of the controlling and other data request input from other port, and selecting a data request for the data transfer by arbitration from the single data request and the other data request; and carrying out the data transfer according to the data request selected at the second arbitrating;

storing, in a busy state resolution waiting information storage unit, busy state resolution waiting information of usage of the receive resources for each of the transmitting circuits and for each type of the data requests, and setting, when the busy state resolution waiting information for any of the transmitting circuits is stored in the busy state resolution waiting information storage unit, usage of the receive resources in a busy state for a data request of a same type as appropriate data requests of all of the transmitting circuits, wherein the controlling includes canceling output of the single data request selected at the first arbitrating and inhibiting a data request corresponding to the single data request from participating in the first arbitrating, when the usage of the receive resources monitored at the monitoring is in a busy state.

5. The data transfer method according to claim 4, wherein the setting includes setting the busy state resolution waiting information when the receive resources are detected to be in a busy state at the monitoring while the data requests are being arbitrated at the second arbitrating, and resetting the busy state resolution waiting information when the data request is selected at the second arbitrating.

6. The data transfer method according to claim 5, further comprising:

time counting includes starting time counting when output of the single data request is canceled at the controlling because usage of the receive resources monitored for each of the transmitting circuits and for each type of the data requests at the monitoring is in a busy state and stopping time counting when the single data request is selected at the second arbitrating, and activating a function at the setting when a time counted at the time counting exceeds a given threshold.

* * * * *